(12) United States Patent
Gaathon et al.

(10) Patent No.: US 12,481,850 B2
(45) Date of Patent: *Nov. 25, 2025

(54) GENERATING A UNIQUE CODE FROM ORIENTATION INFORMATION

(71) Applicant: DUST Identity, Inc., Newton, MA (US)

(72) Inventors: Ophir Gaathon, Needham, MA (US); Jonathan Hodges, Princeton, NJ (US)

(73) Assignee: DUST Identity, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,390

(22) Filed: Sep. 18, 2023

(65) Prior Publication Data

US 2024/0005116 A1 Jan. 4, 2024

Related U.S. Application Data

(63) Continuation of application No. 17/686,012, filed on Mar. 3, 2022, now Pat. No. 11,809,950, which is a
(Continued)

(51) Int. Cl.
*G06K 7/14* (2006.01)
*G01N 21/64* (2006.01)
(Continued)

(52) U.S. Cl.
CPC .......... *G06K 7/1417* (2013.01); *G01N 21/64* (2013.01); *G01N 24/08* (2013.01); *G06K 7/1413* (2013.01);
(Continued)

(58) Field of Classification Search
CPC ........ G06K 19/00; G06K 19/04; G06K 19/06; G06K 7/1417; G06K 7/1413;
(Continued)

(56) References Cited

U.S. PATENT DOCUMENTS 5,449,895 A 9/1995 Hecht et al.
6,584,214 B1 6/2003 Pappu et al.
(Continued)

FOREIGN PATENT DOCUMENTS

CN 1781114 5/2006
CN 101479629 7/2009
(Continued)

OTHER PUBLICATIONS

Office Action dated Aug. 30, 2021, in IL 282209, 1 pg.
(Continued)

*Primary Examiner* — Edwyn Labaze
(74) *Attorney, Agent, or Firm* — Henry Patent Law Firm PLLC

(57) ABSTRACT

In a general aspect, orientation information is used to generate a unique code. In some aspects, orientation information is extracted from an object. The object includes multiple elements, and the orientation information indicates the relative spatial orientations of the respective elements. The orientation information can be extracted, for instance, by a scanner system that detects the elements. A unique code is generated for the object based on the orientation information. In some examples, the elements are diamond particles that each have one or more color centers, and the orientation information is extracted by detecting the color centers.

21 Claims, 16 Drawing Sheets

Related U.S. Application Data continuation of application No. 16/879,957, filed on May 21, 2020, now Pat. No. 11,308,299, which is a continuation of application No. 16/081,593, filed as application No. PCT/US2017/021117 on Mar. 7, 2017, now Pat. No. 10,685,199.

(60) Provisional application No. 62/305,173, filed on Mar. 8, 2016.

(51) Int. Cl.
| | | |
|---|---|---|
| *G01N 24/08* | (2006.01) | |
| *G06K 19/06* | (2006.01) | |
| *G07D 7/00* | (2016.01) | |
| *G07D 7/0047* | (2016.01) | |
| *G07D 7/02* | (2016.01) | |
| *G07D 7/04* | (2016.01) | |
| *G07D 7/12* | (2016.01) | |
| *G07D 7/202* | (2016.01) | |
| *G07D 7/2033* | (2016.01) | |

(52) U.S. Cl.
CPC . *G06K 19/06028* (2013.01); *G06K 19/06037* (2013.01); *G07D 7/003* (2017.05); *G07D 7/0047* (2017.05); *G07D 7/02* (2013.01); *G07D 7/04* (2013.01); *G07D 7/12* (2013.01); *G07D 7/2033* (2013.01); *G07D 7/2041* (2013.01); *G07D 2207/00* (2013.01)

(58) Field of Classification Search
CPC ....... G06K 19/06028; G06K 19/06037; G07D 7/0047; G07D 7/003; G07D 7/02; G07D 7/04; G07D 7/12; G07D 7/2033; G07D 7/2041; G01N 24/08
USPC ........ 324/304, 300; 235/494, 487, 375, 454, 235/435
See application file for complete search history.

(56) References Cited

U.S. PATENT DOCUMENTS

| | | |
|---|---|---|
| 6,692,031 B2 | 2/2004 | McGrew et al. |
| 6,917,720 B1 | 7/2005 | Caesar et al. |
| 9,361,532 B2 | 6/2016 | Anand |
| 10,685,199 B2 | 6/2020 | Gaathon et al. |
| 11,308,299 B2 | 4/2022 | Gaathon et al. |
| 11,347,987 B2 | 5/2022 | Robinson et al. |
| 12,214,613 B2 | 2/2025 | Gaathon et al. |
| 2003/0071194 A1 | 4/2003 | Mueller et al. |
| 2006/0086791 A1 | 4/2006 | Austin |
| 2006/0268259 A1 | 11/2006 | Park |
| 2007/0023494 A1 | 2/2007 | Haraszti et al. |
| 2008/0187182 A1 | 8/2008 | Abe |
| 2009/0008924 A1 | 1/2009 | Ophey et al. |
| 2009/0218391 A1 | 9/2009 | He |
| 2009/0309733 A1 | 12/2009 | Moran et al. |
| 2010/0062144 A1 | 3/2010 | Zibrov |
| 2010/0106475 A1 | 4/2010 | Smith et al. |
| 2010/0327050 A1 | 12/2010 | Stierman et al. |
| 2010/0327060 A1 | 12/2010 | Moran et al. |
| 2011/0164748 A1 | 7/2011 | Kohlert et al. |
| 2012/0168506 A1 | 7/2012 | Ruehrmair et al. |
| 2012/0173347 A1 | 7/2012 | De Almeida Neves et al. |
| 2013/0008962 A1 | 1/2013 | Anand |
| 2013/0173484 A1 | 7/2013 | Wesby |
| 2014/0014715 A1 | 1/2014 | Moran et al. |
| 2014/0119615 A1 | 5/2014 | Mercolino et al. |
| 2015/0060699 A1 | 3/2015 | Janoff |
| 2015/0116978 A1 | 4/2015 | Kim |
| 2015/0122138 A1 | 5/2015 | Van Ostrand et al. |
| 2015/0298482 A1 | 10/2015 | Walter et al. |
| 2015/0324618 A1 | 11/2015 | Malcolm et al. |
| 2016/0342885 A1 | 11/2016 | Toedtli et al. |
| 2017/0035527 A1 | 2/2017 | Whitton et al. |
| 2017/0154343 A1 | 6/2017 | Kozlowski et al. |
| 2018/0088112 A1 | 3/2018 | Fan et al. |
| 2018/0304611 A1 | 10/2018 | Kwon et al. |
| 2019/0095668 A1 | 3/2019 | Gaathon et al. |
| 2020/0285824 A1 | 9/2020 | Gaathon et al. |
| 2022/0242160 A1 | 8/2022 | Gaathon et al. |
| 2022/0245372 A1 | 8/2022 | Gaathon et al. |
| 2022/0366061 A1 | 11/2022 | Spivack et al. |

FOREIGN PATENT DOCUMENTS

| | | |
|---|---|---|
| CN | 110046686 | 7/2019 |
| CN | 110079783 | 8/2019 |
| DE | 10304805 | 8/2004 |
| EP | 1475242 | 11/2004 |
| EP | 2163392 | 3/2010 |
| EP | 3255467 | 12/2017 |
| FR | 3068502 | 1/2019 |
| GB | 2304077 A | 3/1997 |
| GB | 201510072 | 7/2015 |
| JP | 60-21236 | 2/1985 |
| JP | 2006146478 | 6/2006 |
| JP | 2007519983 | 7/2007 |
| JP | 2009537030 | 10/2009 |
| JP | 2013058053 | 3/2013 |
| JP | 2015153005 | 8/2015 |
| JP | 2023500531 | 1/2023 |
| WO | 2005052650 | 6/2005 |
| WO | 2012038842 | 3/2012 |
| WO | 2012160571 | 11/2012 |
| WO | 2013168962 | 11/2013 |
| WO | 2015077471 | 5/2015 |
| WO | 2015167367 | 11/2015 |
| WO | 2017155967 | 9/2017 |
| WO | 2021092121 | 5/2021 |

OTHER PUBLICATIONS

USPTO, Notice of Allowance issued in U.S. Appl. No. 17/686,012 on Jun. 14, 2023, 11 pages.
KIPO, International Search Report and Written Opinion mailed Feb. 26, 2021, in PCT/US2020/059031, 12 pgs.
USPTO, Third Party Submission mailed Sep. 11, 2019, in U.S. Appl. No. 16/081,593, 12 pgs.
EPO, Communication pursuant to Article 94(3) EPC mailed Apr. 26, 2023, in EP 20885405.9, 14 pgs.
EPO, Communication pursuant to Rule 164(1) EPC mailed Dec. 6, 2022, in EP 20885405.9, 14 pgs.
Third Office Action mailed May 6, 2022, in CN 201780028643.9, 14 pgs.
USPTO, Third Party Submission filed Mar. 24, 2021, in U.S. Appl. No. 16/879,957, 14 pgs.
USPTO, Non-Final Office Action mailed Apr. 13, 2021, in U.S. Appl. No. 16/879,957, 16 pgs.
Office action mailed Oct. 6, 2022, in IL 292795, 2 pgs.
USPTO, Non-Final Office Action mailed Nov. 20, 2019, in U.S. Appl. No. 16/081,593, 22 pgs.
Korean Intellectual Property Office, International Search Report and Written Opinion issued in International Application No. PCT/US2017/021117 on Jul. 11, 2017, 26 pages.
USPTO, Non-Final Office Action mailed Jan. 24, 2023, in U.S. Appl. No. 17/686,012, 28 pgs.
Israeli Patent Office, Official Notification Under Section 26 of the Law (allowable) mailed Feb. 28, 2021 in IL261300, 3 pgs.
Official Notification mailed Oct. 1, 2020, in IL 261300, 4 pgs.
USPTO, Non-Final Office Action issued in U.S. Appl. No. 17/721,524 on Aug. 25, 2023, 42 pages.
CNIPA, First Office Action mailed Apr. 20, 2021, in CN 201780028643.9, 43 pgs.
CNIPA, Office Action and supplementary search report mailed Dec. 9, 2021, in CN 201780028643.9, 54 pgs.
USPTO, Final Office Action mailed May 4, 2023, in U.S. Appl. No. 17/686,012, 6 pages.

(56) References Cited

OTHER PUBLICATIONS

EPO, Communication pursuant to Art. 94(3) mailed Nov. 17, 2022, in EP 17763883.0, 6 pgs.
EPO, Extended European Search Report mailed Nov. 5, 2019, in EP 17763883.0, 7 pgs.
Israeli Patent Office, Examination Report issued in Application No. 282209 on Mar. 29, 2023, 8 pages.
USPTO, Notice of Allowance issued Dec. 15, 2021, in U.S. Appl. No. 16/879,957, 8 pages.
Office Action mailed Dec. 7, 2021, in IL 282209, 8 pgs.
USPTO, Notice of Allowance mailed Dec. 15, 2021, in U.S. Appl. No. 16/879,957, 8 pgs.
JPO, Office Action issued in Application No. 2022-526019 on Jun. 15, 2023, 9 pages.
USPTO, Final Office Action mailed Sep. 29, 2021, in U.S. Appl. No. 16/879,957, 9 pgs.
USPTO, Notice of Allowance mailed Apr. 6, 2020, in U.S. Appl. No. 16/081,593, 9 pgs.
Chen, E. H., et al., "Wide-Field Multispectral Super-Resolution Imaging Using Spin-Dependent Fluorescence in Nanodiamonds", Nano Letters 2013 13 (5), 2013, pp. 2073-2077.
Kipphan, "Handbook of Print Media", Springer Verlag, 2000, 27 pgs.
Pappu, R., et al., "Physical One-Way Functions", Science, vol. 297, Sep. 2002, pp. 2026-2030.
KIPO, Notice of Non-Final Rejection issued in Application No. 2022-7018714 on Feb. 28, 2014, 21 pages.
USPTO, Final Office Action issued in U.S. Appl. No. 17/721,524 on Feb. 8, 2024, 7 pages.
CNIPA, Office Action issued in Application No. 202080091951.8 on Jan. 31, 2024, 25 pages.
JPO, Office Action issued in Application No. 2022-526019 on Feb. 13, 2024, 5 pages.
EPO, Extended European Search Report issued in Application No. 23207428.6 on Jan. 31, 2024, 9 pages.
"All Labels Ltd:: Parking Permits", Retrieved from https://web.archive.org/web/20141110165748, retrieved on Jan. 22, 2024, 2 pages.
"Consecutive Numbered Labels and Consecutively Numbered Labels—U.S. Graphics, Inc.", Retrieved from https://web.archive.org/web/20140517193325, retrieved on Jan. 22, 2024, 9 pages.
EPO, Communication pursuant to Article 94(3) issued in Application No. 17763883.0 on Dec. 6, 2023, 7 pages.
CNIPA, First Office Action issued in Application No. 202310062637.2 on Oct. 25, 2024, 16 pages.
CNIPA, Notifications to Grant issued in Application No. 202080091951.8 on Nov. 18, 2024, 6 pages.
CNIPA, Decision of Rejection issued in Application No. 202310062637.2 on Mar. 19, 2025, 13 pages.
JPO; Office Action issued in Application No. 2024-1350563 an Jun. 19, 2025, 14 pages.

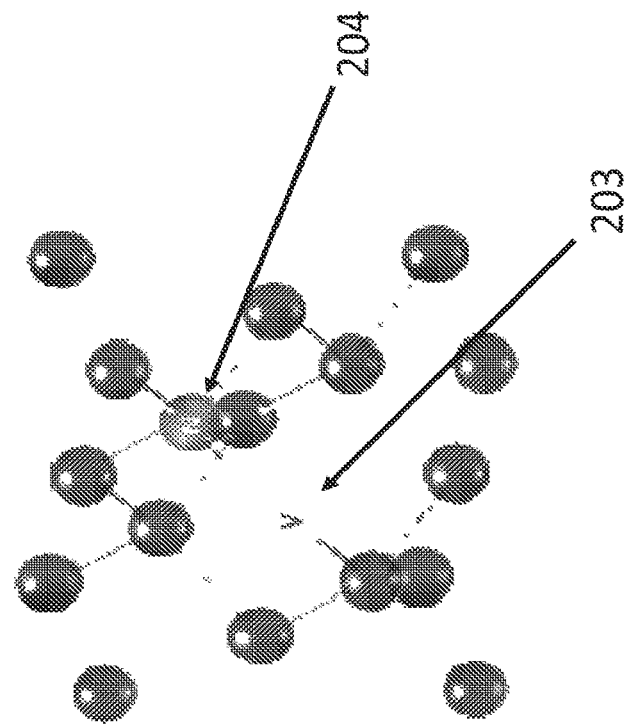
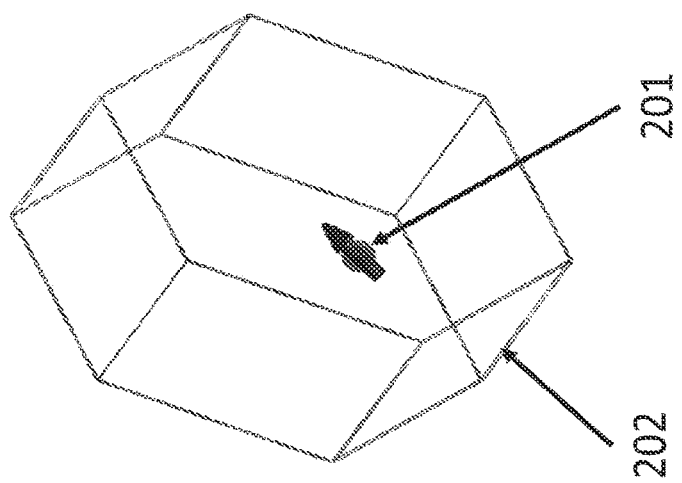
FIG. 2B
FIG. 2A

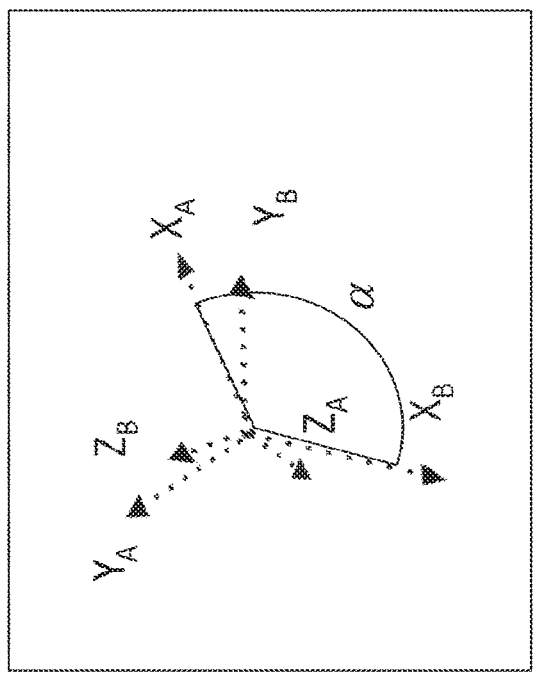
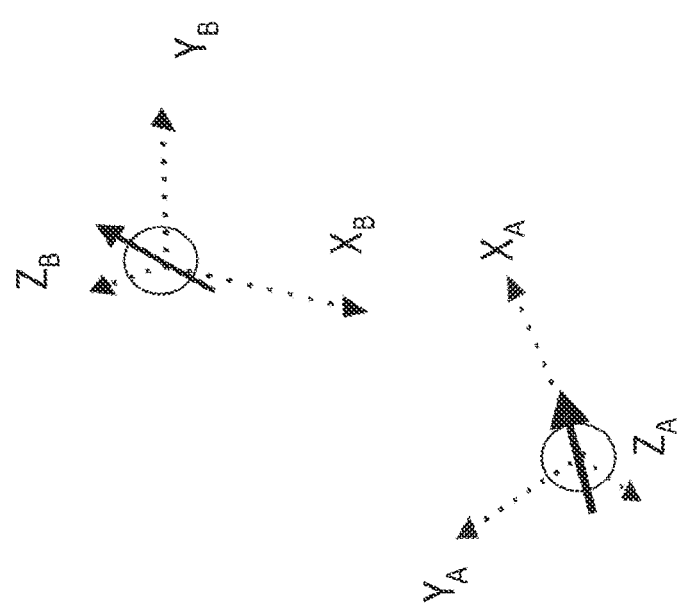
FIG. 7

$| S_{Ai}(x,y,\theta,\phi) - S_{Bi}(x,y,\theta,\phi) | < \varepsilon$

GENERATING A UNIQUE CODE FROM ORIENTATION INFORMATION

CROSS-REFERENCE TO RELATED APPLICATIONS

This application is a continuation of U.S. patent application Ser. No. 17/686,012, filed on Mar. 3, 2022, entitled "Generating a Unique Code from Orientation Information", which is a continuation of U.S. patent application Ser. No. 16/879,957, filed on May 21, 2020, entitled "Generating a Unique Code from Orientation Information", which is a continuation of U.S. patent application Ser. No. 16/081,593, filed on Aug. 31, 2018 and entitled "Generating a Unique Code from Orientation Information," which is a 371 national stage application of International Application No. PCT/US2017/021117, filed on Mar. 7, 2017 and entitled "Generating a Unique Code from Orientation Information," which claims priority to U.S. Provisional Application No. 62/305,173, filed on Mar. 8, 2016 and entitled "Methods and Systems for Authenticating Objects Using Unique Markers," all of which are hereby incorporated by reference.

BACKGROUND

The following description relates to generating a unique code from orientation information.

Anti-counterfeit techniques, cryptography protocols and other measures are often used for security applications. Examples of anti-counterfeit techniques include holograms, fluorescent dyes, or engineered DNA strands. Examples of cryptography protocols include authentication schemes (e.g., digital signature protocols, challenge-response protocols) and encryption schemes, for example, in a public key infrastructure (PKI).

DESCRIPTION OF DRAWINGS

FIG. 2A schematically illustrates an example particle comprised of a diamond crystal containing a defect center.

FIG. 2B schematically illustrates an NV-defect center in the example diamond crystal lattice of FIG. 2A.

FIG. 7 illustrates example particle reference frame orientations used for calculating particle orientations.

DETAILED DESCRIPTION

Figure 1A:
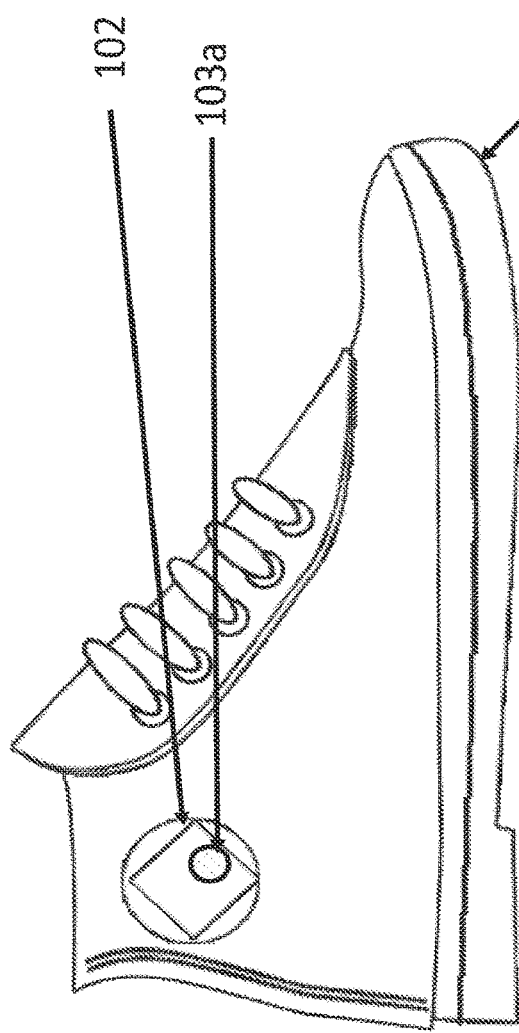
FIG. 1A illustrates an example article with a unique authentication marker.
Figure 1B:
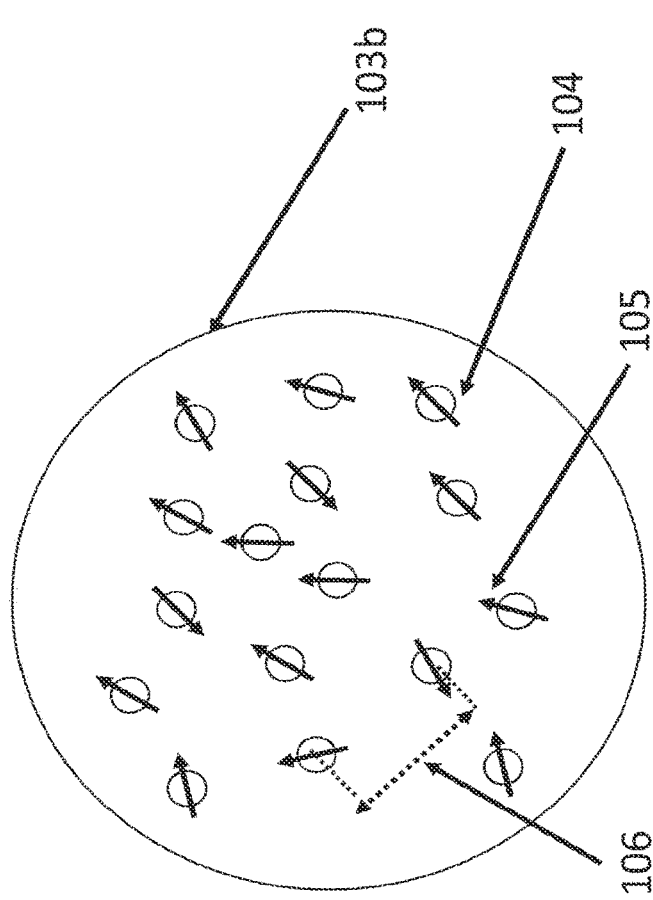
FIG. 1B schematically illustrates the example unique marker of FIG. 1A.

Some aspects of what is described here relate to generating a unique code based on orientation information. The unique code may be used, for example, to authenticate an object. For instance, the orientation information may be extracted from a marker or another object. The unique code can be used to authenticate objects in a similar way as barcodes and quick-response (QR) codes are currently used to readily identify objects.

Various types of objects can be authenticated using the methods and systems discussed herein. Non-limiting illustrative examples of objects include bank notes and certificates, credit cards and alike, electronic payment systems, voting systems, communication systems and elements, jewelry and collectables, diamonds and gems, packaging, paper products, electronic equipment cases, electronic components and systems (e.g., integrated circuits, chips, circuit boards), retail goods (e.g., handbags, clothing, sports equipment), industrial components and systems (e.g., machine parts, automotive parts, aerospace parts), raw materials (processed or unprocessed) (e.g., ingots, billets, logs, slabs), food products and packaging (e.g. wines, spirits, truffles, spices), pharmaceuticals, pharmaceutical packaging and lots, medical devices and surgical tools and their packaging, Official Documents (e.g., contracts, passports, visas), digital storage systems and elements, mail and postal packaging, seals and tamper-proof labels. It should be understood that this list of examples is not exhaustive, and many other types of objects can be authenticated using the methods and systems disclosed herein.

In some implementations, the object is a structure that includes a collection of crystalline particles or other elements in a host material. The crystalline particles may be confined within the area of an authentication marker, or the crystalline particles may be otherwise distributed in a portion of the object. The particle orientations may be randomly distributed; the particle sizes and relative positions can be regular or randomly distributed. In some examples, making a copy of an object with a similar composition of particles is sufficiently unlikely such that the object can be considered unique. A marker may be used as a "fingerprint," for instance, when attached to an article, enabling its authenticity to be validated.

In some implementations, articles are authenticated as follows. After applying an authentication marker to the article, an initial or 'origin' scan is performed with an origin scanner that registers the relative position and orientation of the crystals in an origin position-and-orientation map. In some implementations, this is done by conducting a magnetic resonance measurement of fluorescent atomic defects in the crystals, in parallel for each crystal, under known applied magnetic fields. In some cases, in addition to the position and orientation of the crystals, the size of each crystal is determined and registered for use in authentication. Particle orientation can be calculated from the projection of the magnetic field vector along the defect center axis. The orientation information does not have to be complete; partial projections of orientations may be used. Orientation information can be thought of geometrically. We represent the defect-center as a unit vector originating at its center. The orientation of the vector can be described using spherical coordinates around its origin. The longitude and latitude coordinates can be fully or partially described and known. In some examples, the orientation information is interrogated by measuring the Zeeman shift of the defect center to a magnetic field that its magnitude and orientation is known. Partial orientation information can be deduced by a single measurement where the defect center orientation is projected onto the magnetic field plane. Full orientation information can be extracted by combining several such measurements at different magnetic field orientations.

Once article authentication is desired (e.g. once the article reaches a destination), the authentication marker on the article is scanned in a similar fashion to the initial scan (but not necessarily with the same magnetic field or fields configuration) the second scan is used to determine the relative position and orientation of the crystals. Partial or complete orientation information is calculated based on predetermined settings of the magnetic field at the time of the second scanning. This calculation results in the orientation map of the marker that can be compared with the known map from a prior scan (e.g., the original scan).

One example comparison would be to find the set of position values on the prior scan (origin) map where each corresponding position on the current scan (destination) map of the set differs by no more than a value, V. For example, V can be a fraction of each particle's size. For the particles in this subset, their orientations can be found in the orientation map. The angle between the particle orientation in the origin map and the particle orientation in the destination map can be calculated. Only particles in the subset whose angle difference is less than a predetermined threshold value, W, chosen with constraint from conditions of the destination scanner (e.g. magnetic field strength, detection time, etc.) qualify as a match. If the two maps exceed threshold criteria for matching, the article at the destination can be considered authentic and uniquely identified. One threshold criterion might be the fraction of matching particles being 90% of the total number of particles in the origin position map.

In some implementations, the crystalline particles in a unique marker contain fluorescent color-centers such that their positions and sizes can be obtained using standard imaging techniques. The orientation of the crystalline particles can also be determined using a variation of standard fluorescence microscopy combined with magnetic resonance techniques. The relative orientations of the particles may be random (the relative positions and sizes of the particles may also be random), and a large enough collection of particles will generally be unique and distinct in its attributes.

The properties of the nitrogen-vacancy center (NVC) in diamond and other crystalline particles containing color-centers may be exploited for use in unique markers and other objects in some instances.

Several unique combinations of crystalline particle hosts and color-centers enable a magnetic resonance response yielding orientation information about the particle as well as its position and size. The NVC in diamond is one example of a color-center that exhibits optically detected magnetic resonance. The NVC exhibits a broad fluorescence response in the 635 nm-800 nm optical wavelength range when excited with optical radiation below 600 nm (typically near 530 nm). Due to the symmetry of the diamond lattice and the composition of the NV, the electronic ground state of this center is a spin triplet with an intrinsic crystal field that splits the energy of the 0 spin sublevel from the two spin 1 sublevels. This energy splitting is in the microwave regime, near 2.8 GHz, where transitions between the 0 and ±1 sublevels are driven by resonant excitation. With a magnetic field applied along the NV-symmetry axis, the ±1 sublevels shift in energy in proportion with the magnitude of the applied magnetic field (Zeeman Effect). This results in two different frequencies satisfying a resonance condition. Inversely, if the field orientation is known, the orientation of the crystal containing the NV can be obtained through measurement of the resonance frequencies and back-calculating the projection onto the NV axis. In addition, the triplet/single electronic structure of the NVC facilitates the measurement of the magnetic response. After brief (<5 µs) illumination of optical radiation (<600 nm wavelength) the relative populations of the 0,±1 spin sublevels change and polarize preferentially to the 0 state after a few microseconds at the cessation of illumination due to intrinsic interconversions between singlet and triplet states. Moreover, such interconversions result in discrimination of the spin-sublevel populations, as the ±1 sublevels result in ~30% less fluorescence than the 0 spin sublevel.

FIG. 1A illustrates an example article, in this example a sneaker 101, having a unique marker 103a incorporated into the article, which may be used to validate the authenticity of the article. The unique marker 103a can be incorporated onto the article in a variety of ways including, e.g., in a logo 102 as shown in the FIG. 1A. It may also be incorporated into a label or elsewhere in the article and need not be visible to the naked eye. The unique marker (UM) under ample magnification 103b and with the technique mentioned below can be used to reveal the orientation 105 and relative positioning 106 of a collection of particles 104 in the UM.

In some cases, the uniqueness of a marker is derived from the relative positioning and orientation of particles or other elements within the host material. FIG. 2A schematically illustrates a crystalline particle 202, which contains at least one defect-center (also known as a color-center) 201 that emits fluorescent light. One example of a crystalline particle host is diamond, composed of a regular repeated structure of carbon atoms 203 as shown in FIG. 2B. One example of a color-center in diamond is the nitrogen vacancy center 204, which consists of a carbon of the lattice replaced with a nitrogen and a nearest neighbor carbon to that nitrogen being removed entirely. The orientation of the color center may be defined, for example, by the vector from the nitrogen atom to the vacancy. In some instances, the symmetry of the lattice and four-fold symmetry of an NV center may preclude absolute knowledge of the crystal orientation, and the relative orientation of two centers may be known with two-fold symmetry.

Figure 3:
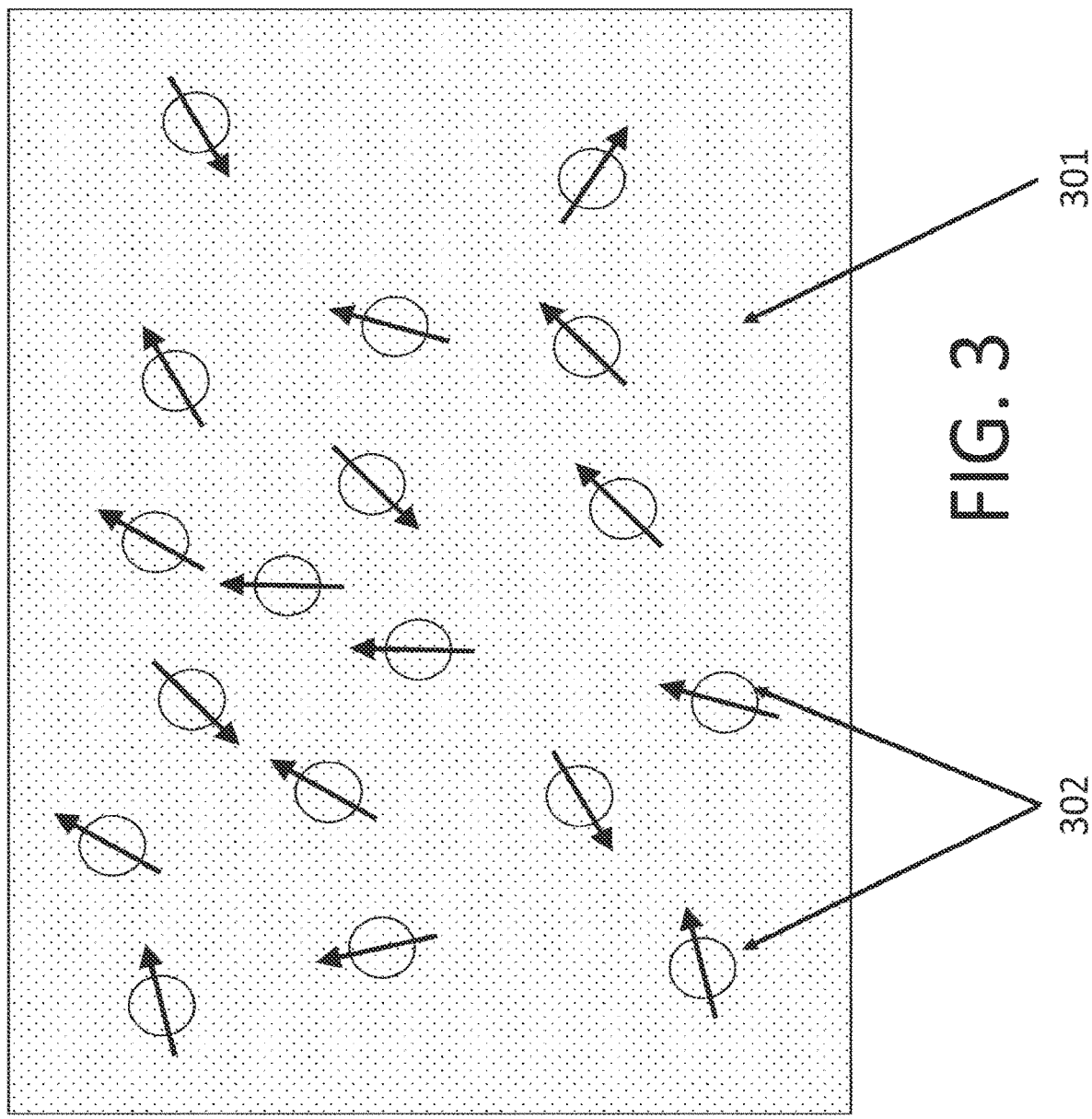
FIG. 3 schematically illustrates an example random distribution of particles in or on a host material in a unique marker.

FIG. 3 shows an extended film or volume of host material 301 containing many particles of which a subset bears at least one color-center 302. The separation of those particles as well as the orientation of the particles can be arbitrary.

Figure 4:
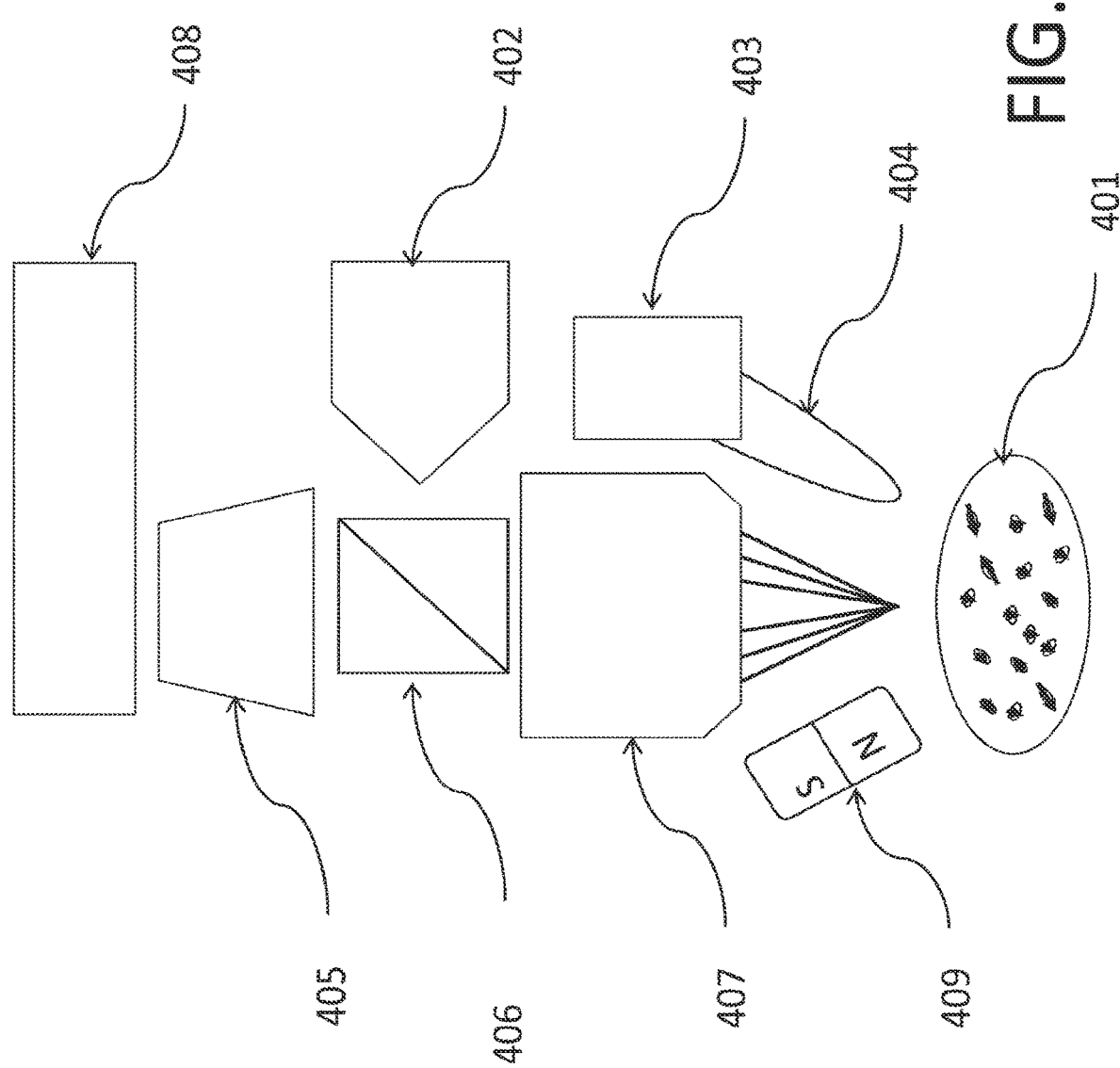
FIG. 4 schematically illustrates an example scanner system for measuring the position and orientation of particles in a unique marker.
Figure 5:
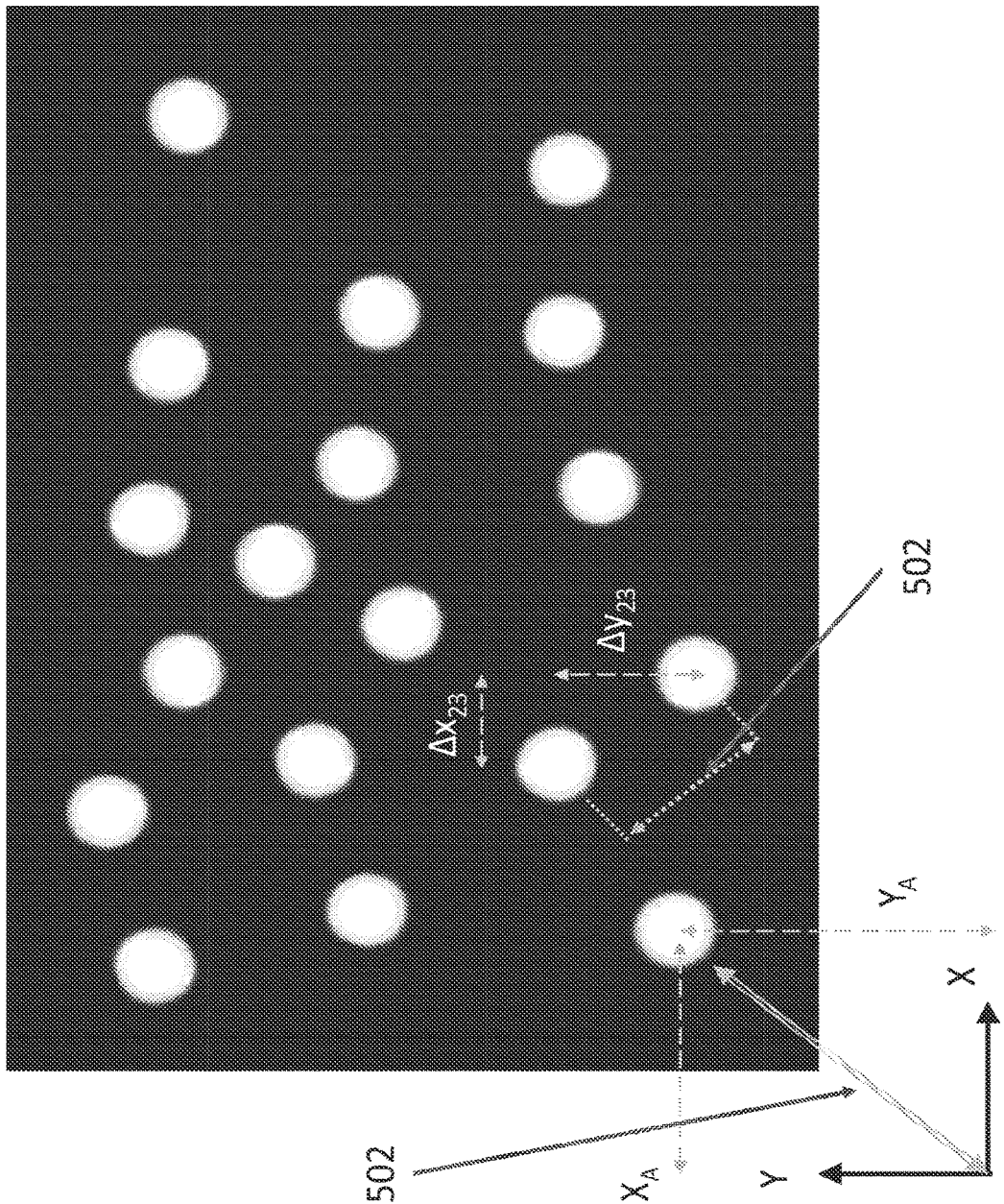
FIG. 5 illustrates particle positions in an example image obtained from a fluorescence scan.

Information on the separation and orientation of the particles can be obtained by imaging the unique marker using conventional optical microscopy techniques. FIG. 4 schematically illustrates an example scanner used for determining the separation and orientation of the particles. In the example shown, a unique marker (a composite of host film and particles) 401 is illuminated with a light source 402, such as a laser, which is reflected and transformed through a set of standard optical components 406 and through a focusing objective 407. The focusing objective 407 is configured to provide magnification of the particles' fluorescence sufficient to resolve the field of view of interest of the unique marker. This may be the entire unique marker or a region of interest of the unique marker. After proper filtering of the illumination source from the fluorescence and image formation with standard filters and optics 406, an image of the host plane is captured on an imaging unit 405, such as, e.g., a CMOS or CCD camera. FIG. 5 shows an example image 500, from which the positions from a fixed coordinate system 501 and relative distances 502 between particles can be obtained. This is one example of several possible techniques for reading the unique marker.

The orientation of the particles can be determined by observing fluorescence changes of the particles due to the relative orientation of electromagnetic fields oriented in the scanner reference frame relative to the particle. One example is changing the transverse optical polarization of the propagating electromagnetic radiation (i.e., illumination light) to be linearly or circularly polarized using standard waveplates in the optics system 406. This has an effect in many crystalline materials containing color-centers including the diamond-NV system in 203. Alternatively, the response of the NVC (properly, the negatively charged NVC) to a magnetic field can also provide information about the orientation. This is observed through an intrinsic magnetic resonance condition in the microwave RF regime. The magnet module of the scanner 409, tunes the magnitude and orientation of the magnetic field applied to the unique marker. The microwave antenna 404 and RF signal generator 403 output frequency are tuned to the changing resonance condition of the magnet. A main logic module 408 controls the output of the laser (e.g., amplitude, time-dependent modulation), the microwave or RF fields (e.g., amplitude, phase, resonance frequency), and the magnetic field orientation and magnitude in a coordinated fashion such that a set of fluorescence images can be used to determine the particle orientation.

The resulting image can be similar to an optical image taken with a telescope (in the visible light spectrum) of the sky at night on one particular night: a mostly dark background with a variety of bright spots sizes and many separations between spots. The position of any one star, planet or celestial body in the sky can be described by its displacement from a reference celestial body, say the North Star (Polaris), assuming the observation point on the surface of the Earth is known. Similarly, registration markings (e.g., fiducial markings) in the unique marker can guide the positioning of the scanner to aid in obtaining reproducible images of the same unique marker taken at different instances in time or at different locations using similar, but not necessarily identical, optical scanner systems. The positions of fluorescing particles in the scan can be determined with respect to these registration markers to give an absolute measure of their location in the marker. One example of a registration marker is printing (e.g., using inkjet technology) a "+" symbol with an indelible ink that absorbs green light and fluoresces at wavelengths similar to the NVC.

The location of a single bright spot in the image of the UM can be expressed by using a regularly spaced Cartesian grid system 501 assigned to the pixels of the image. A location can be specified as an ordered pair $(X_a, Y_a)$ where X is the pixel coordinate of particle a along one dimension and Y is the coordinate along the orthogonal dimension) 503. Xa and Ya can be integers or real numbers. The set of ordered pair locations $\{(X_a, Y_a), (X_b, Y_b), \ldots, (X_{zz}, Y_{zz})\}$ with respect to a given absolute origin point (0,0) specifies a unique description of the particle locations of the image. If the absolute origin point is not specified, creating a label for each ordered pair and defining the vector separating the two particles also obtains a unique description of the particle positions. For example, if the particle at point $(X2, Y2)$ is labeled "2" and $(X3, Y3)$ is labeled "3", then a unique identifier would be "Δ23"=(X2-X3, Y2-Y3) 503. By calculating all pairwise vectors, there is a unique list of identifiers, L, for describing the locations of the particles that has the additional property of being invariant to global translations of the grid coordinate system. L is unique set for a given host film with arbitrary particle separations.

Figure 6:
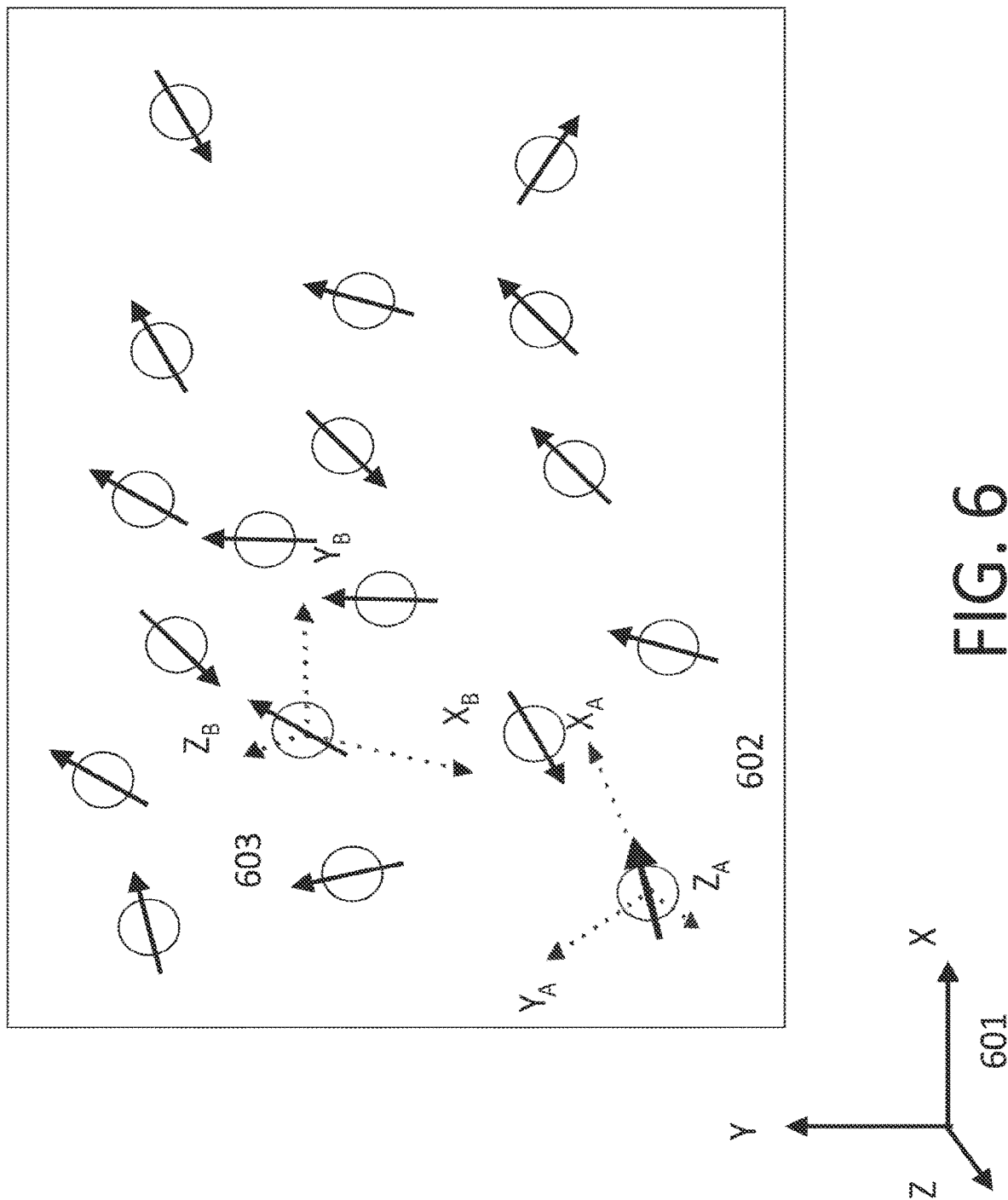
FIG. 6 schematically illustrates example particle orientations in a host material in a unique marker.

In addition to the locations of the particles in the image, the individual particles have an orientation with respect to the host material reference frame. In some cases, if it is assumed that the host material is an extended object, an origin point may be defined within the host material and a right-handed three-dimensional Cartesian coordinate system reference frame can be defined at this origin 601 as shown in FIG. 6. Similarly, a separate right-handed Cartesian coordinate system may be defined for each crystalline particle within the host material. Accordingly, there is a unique coordinate transformation to move between the particle coordinate system and the host material coordinate system. One example parameterization is the use of directional cosines of the two systems, another parameterization is a set of Euler rotations. Similar to the naming convention described above, suppose that a particle at point (XA,YA) is labeled "A" and has a transformation matrix Ta that transforms vectors specified in the "A" frame 602 to the host reference frame. Likewise, a second particle at point (XB, YB) is labeled "B" and has a transformation matrix Tb that moves from the "B" frame 603 to the host reference frame. The transformation matrix serves to identify the orientation of the particle with respect to the coordinate frame. Similarly, the matrix Tab=(Ta)^(-1)*Tb specifies the relative orientation between the particle crystal frames "A" and "B" 701 as shown in FIG. 7. Tab can also be obtained via the directional cosines of the angles between the orthogonal axes comprising the frames A and B. Due to the single crystal nature of the particles, color-centers within the particles have a fixed orientation with respect to the particle coordinate systems. Thus, by measuring the orientation of the color-center with respect to the host material frame, it is possible to determine the particles' orientation using similar coordinate transformations between the color-center's coordinate axes and the crystalline particle coordinate axes. By calculating all pairwise transformations, there is a unique list M, of transformation matrices (e.g., "AB", etc.) for describing the relative orientations of the particles that has the additional property of being invariant to global rotations of the host grid coordinate system. M is unique set for a given host film with random particle orientation.

In instances where the crystal lattice of the particle possesses a high degree of symmetry, there is freedom in specifying the color-center coordinate system axes with respect to the crystal principle axes. In such cases it may not be possible to uniquely transform the color-center's orientation to the crystalline principle axes system using measurements of the color-center alone. In such cases it may suffice to provide a parameterization of the coordinate transformation from the host material reference frame to only a single symmetry axis of the color-center. For example, this transformation can be parameterized by three directional cosines between the symmetry axis and each of the Cartesian coordinate axes. Another parameterization is a polar and azimuthal angle with the former defined as the angle between the z Cartesian axis of the host reference frame and the symmetry axis and the latter defined as the angle between the x Cartesian axis of the host reference frame and the projection of the symmetry axis into the xy Cartesian plane of the host reference frame.

Figure 8:
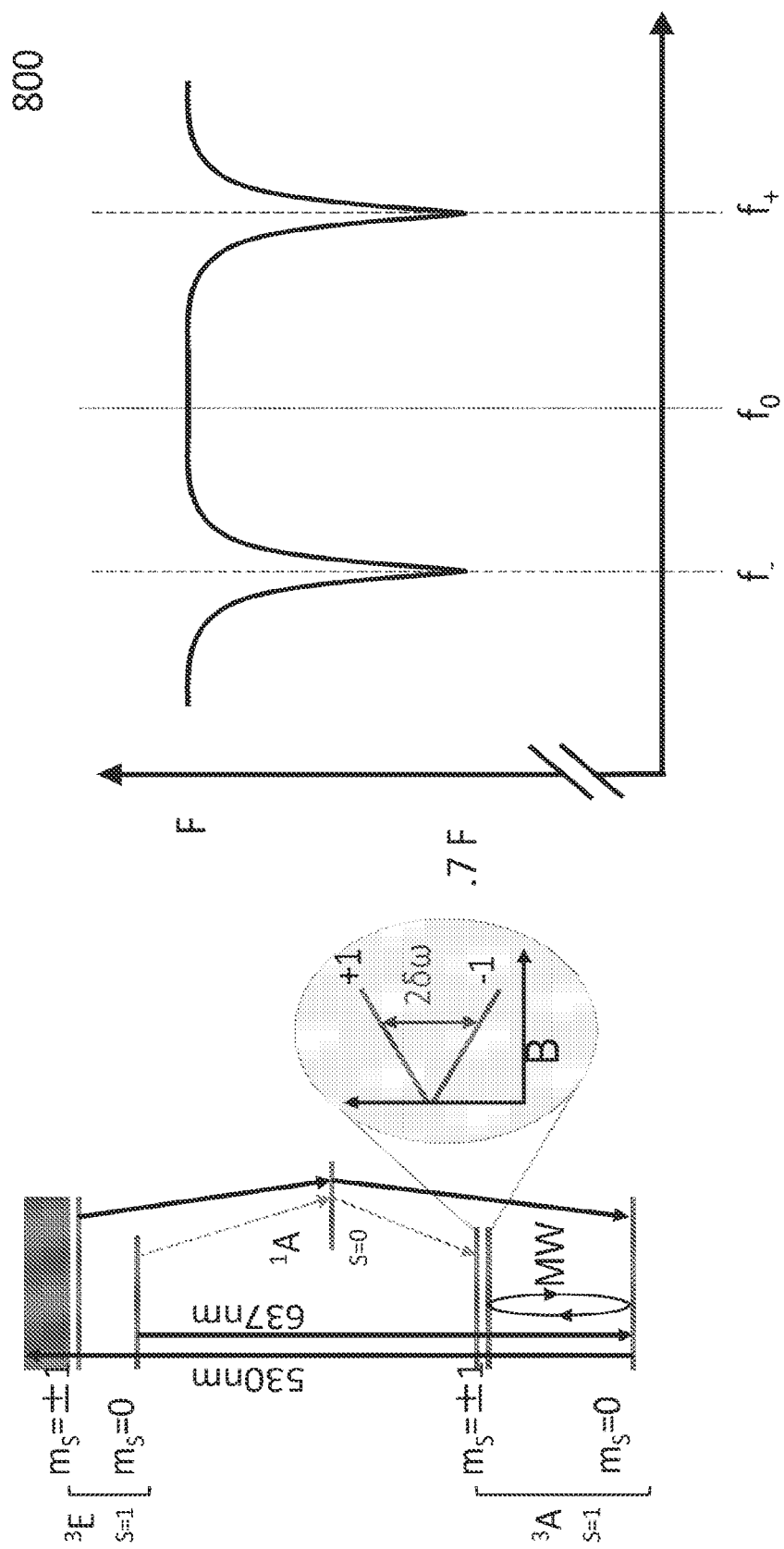
FIG. 8 illustrates an example magnetic resonance response of particles such as NV-center in diamond.

Properties of certain color-centers embedded in crystalline particles can be used to determine the orientation of those particles. As one example, consider the negatively charged nitrogen-vacancy color-center in a diamond crystalline particle. The nitrogen atom and vacancy within the carbon lattice of diamond may define a directional vector with a distinct orientation with respect to the crystal lattice coordinate axes. The photophysics of the color-center may exhibit a decrease in fluorescence when irradiated with an oscillatory radiofrequency field whose frequency is tuned to an intrinsic resonance of the system 800 as shown in FIG. 8. For example, at a frequency of roughly f0=2870 MHz, the photoluminescence of the center decreases by ~30%. Moreover, if a magnetic field is applied along the NV symmetry axis, this single resonance splits into two resonances with distinct frequencies given by f+=2870+2.8G and f−=2870−2.8G for a magnetic field projection of strength G gauss along the symmetry axis. To lowest order, fields orthogonal to this symmetry axis do not contribute to a shift in frequencies. Thus, by maintaining the magnitude of an external magnetic field and changing its direction in a known fashion with respect to a common coordinate system, such as the host material coordinates, it is possible to determine the absolute orientation of the crystalline particle. With this information the distinct orientations of any two particles in the host material pairwise can be established using the aforementioned techniques.

Figure 9B:
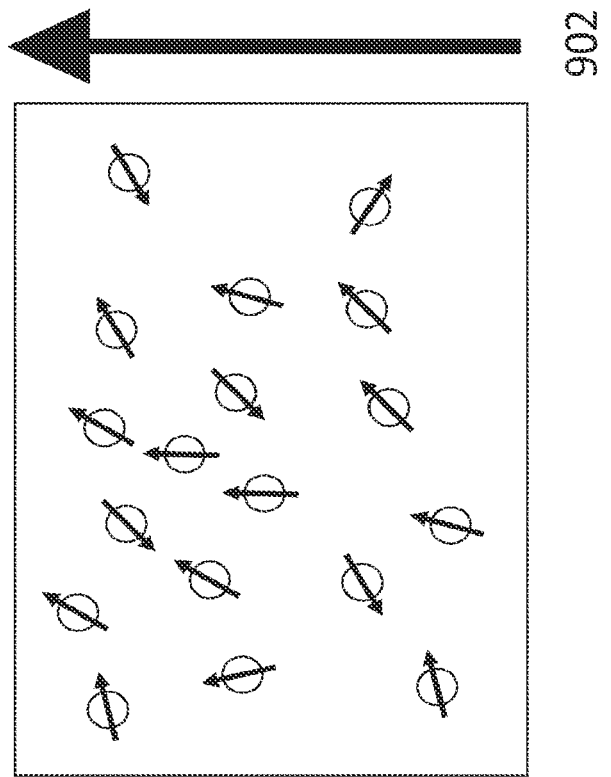
FIGS. 9A and 9B schematically illustrate example magnetic scan configurations.
Figure 9A:
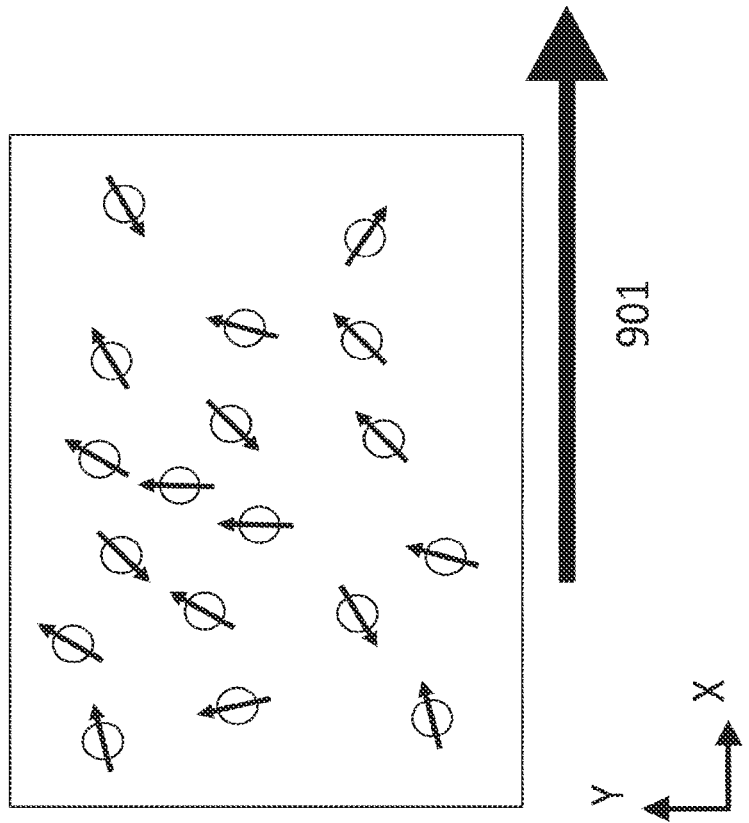
Figure 10:
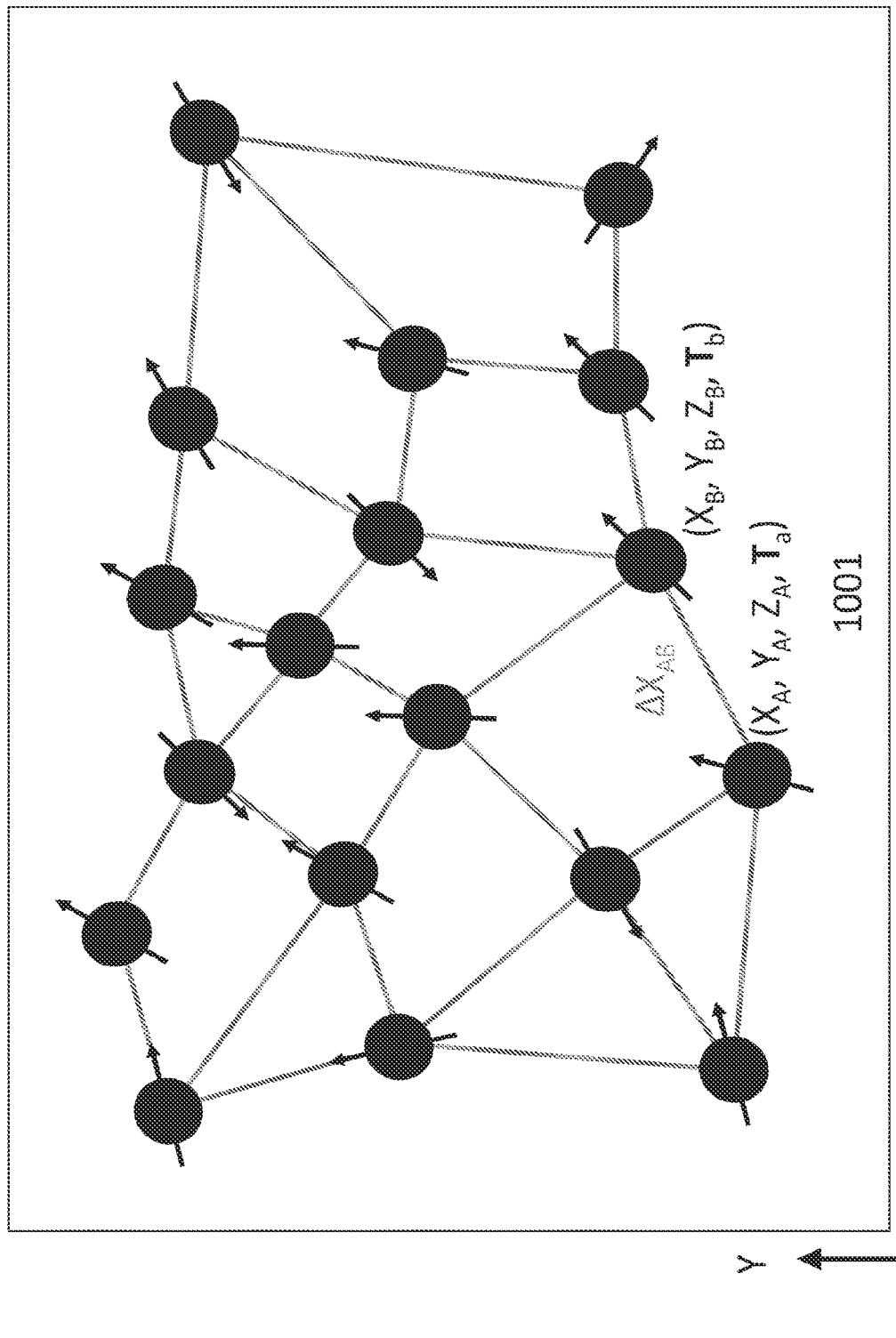
FIG. 10 schematically illustrates an example parameterization of particle positions and orientations.

Provided the number of particles within the host material is small enough, fluorescent light emitted from each individual particle can be spatially localized using aforementioned microscopy techniques. For instance, when the host material contains a sparse distribution of the particles (e.g., having a filling fraction of 20% or less), the resulting fluorescence image may contain more void than particle. By sampling microwave frequencies near f0 with the maximum and minimum frequencies set by the known magnetic fields applied to the host material it is possible to measure the resonance response 800 for each region of interest of individual particles as shown in FIG. 8. Next, by applying static magnetic fields 900 in different orientations with respect to the host film reference frame, it is possible to determine the orientation of individual particles from a series of magnetic resonance responses. For example, the first orientation could be along the host material frame X axis 901 and the second orientation along the host material frame Y axis 902 as shown in FIG. 9. A set of images acquired under these differing microwave frequencies and magnetic field orientations can provide a full scan and description of the spatial location and orientation of each particle in the host film 1000 as shown in FIG. 10. Each particle contains a unique location and orientation transform matrix 1001. The full orientation of the unique marker can be defined, for instance, as the set of coordinates and matrices for each particle for all i particles in the host film: $\{(X_i,Y_i,Z_i,T_i)\}$. Two random instances of particles set in their respective host fields will have sets of full orientations that do not match thereby guaranteeing the uniqueness of a given set of particles.

In addition to position and orientation characteristics of the unique marker, additional uniqueness can optionally be derived from the size and shape of the particles. This can be done using image processing techniques that analyze the shape (for example an outline) and relative size (e.g., the length of the maximum axis) in the projected image of the particle.

Figure 11A:
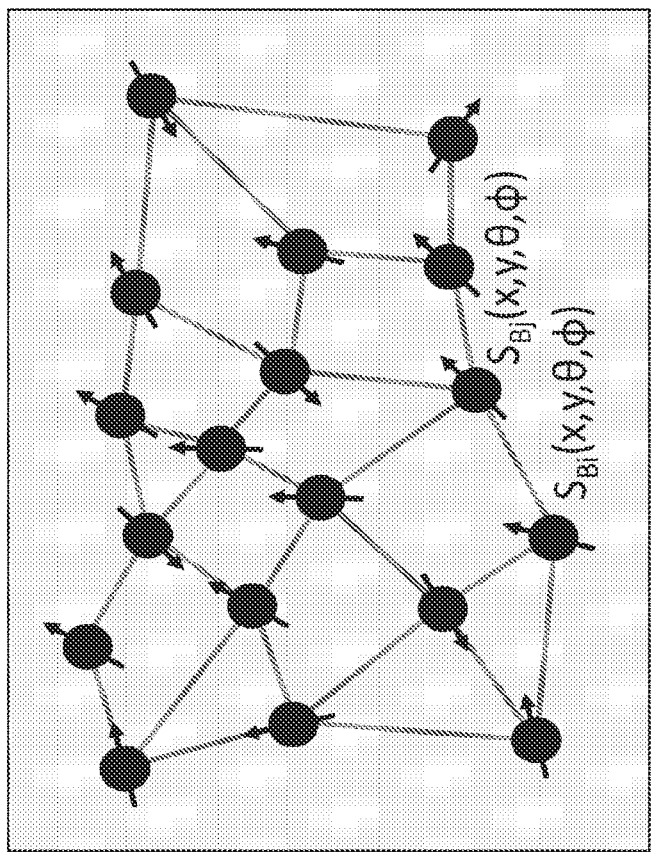
FIGS. 11A and 11B illustrate comparison of two example particle position and orientation sets.
Figure 11B:
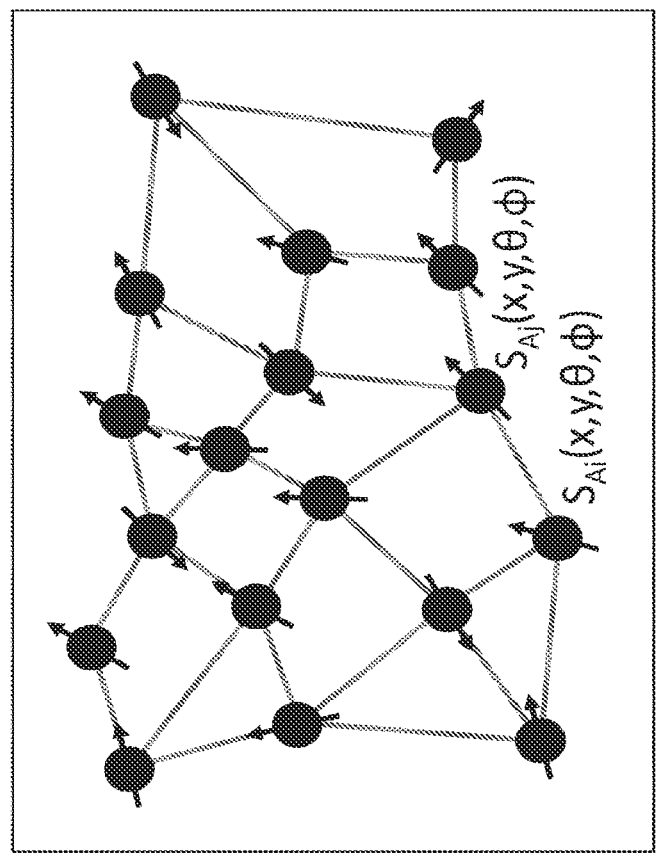

As shown in FIG. 11, in some cases, a given unique marker can be identified by a test measurement 1101 of the full orientation and matching the set of particle positions and orientations $s=\{(X_i,Y_i,Z_i,T_i)\}$ to the known full orientation of the unique marker 1102 $s0=\{(X_i,Y_i,Z_i,T_i)\}$ with sufficient overlap to assure that the measured object is the same physical unique marker: $|s-s0|<\varepsilon$ 1103. Here |.| represents a collective distance measure for the set vectors, such as the norm, and e represents a single parameter threshold determining equivalence of two sets.

Figure 12:
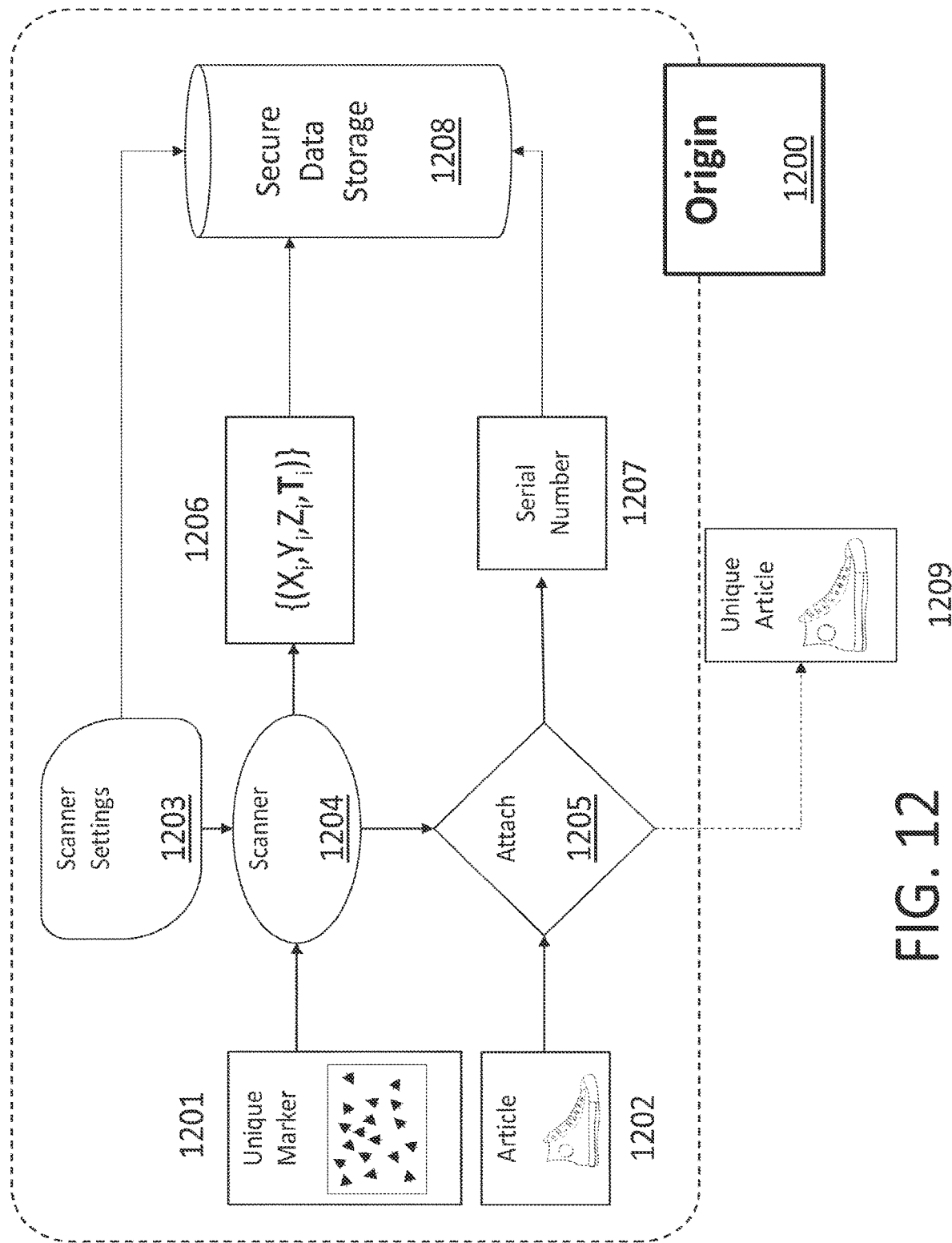
FIG. 12 is a flow diagram schematically illustrating an example process for making an original scan of a unique marker.
Figure 13:
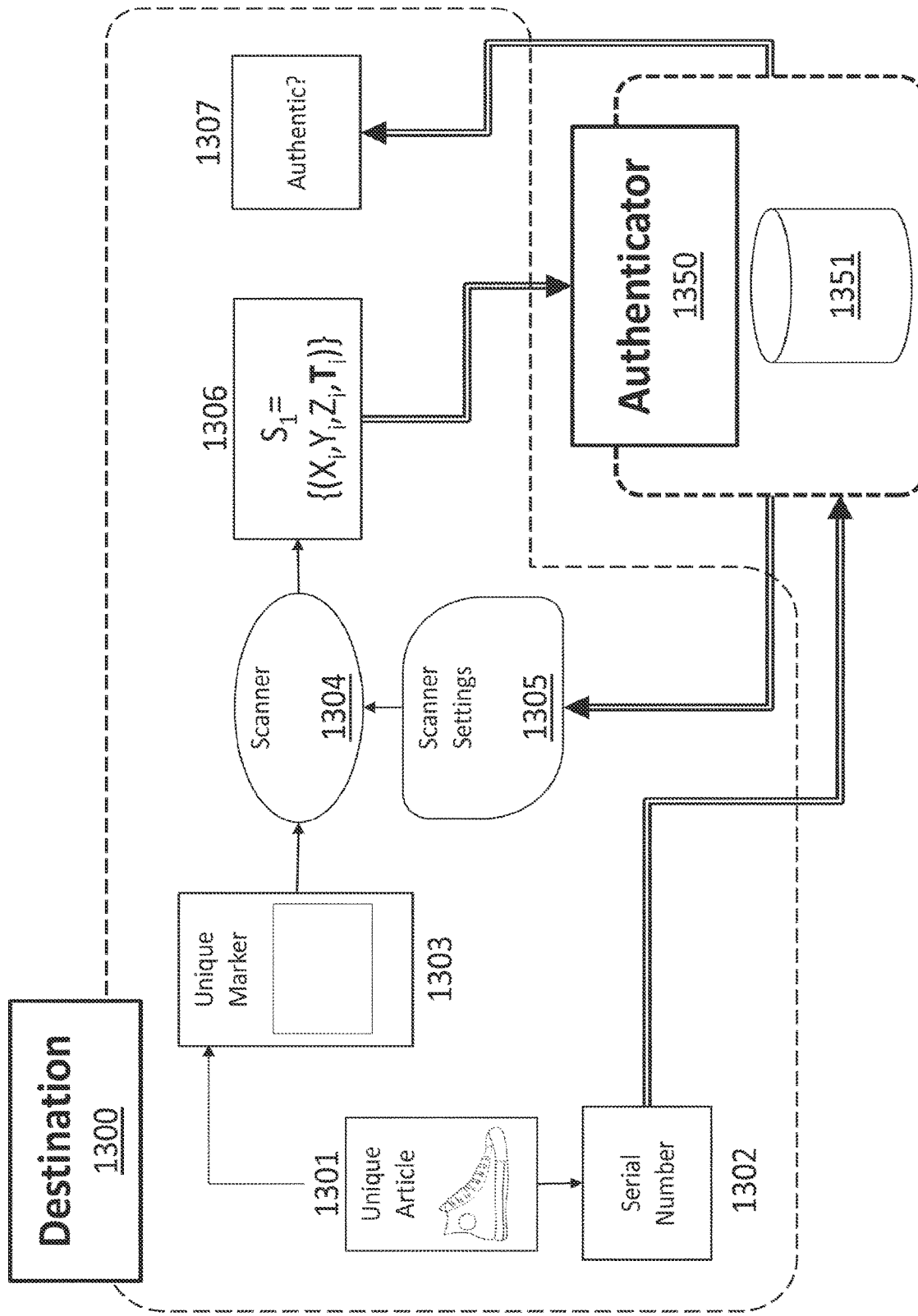
FIG. 13 is a flow diagram schematically illustrating an example process for making a destination scan of a unique marker.

FIGS. 12 and 13 illustrate an example process for authenticating an article.

In a first example, two locations are involved in the identification. The origin 1200 is the place where the unique marker is first scanned. The complete position and orientation of the unique marker 1201 is obtained using the techniques described herein with a scanner 1204 capable of applying arbitrary magnetic field configurations as used for the complete scan. The unique marker is associated with a serial number 1207 and is affixed to the article 1202 of interest. The complete position information, orientation information 1206 and scanner settings 1203 at the origin are associated with the serial number 1207 and stored securely. Such storage 1208 could be local to the origin or be located at a remote data center 1351 receiving the data over the Internet or other network. The unique article 1209 then leaves the origin.

At a destination 1300 (which may be a physical location separate from the origin or as discussed below at the same location as the origin), it is desired that the unique marker 1303 attached to the unique article 1301 be identified and authenticated. In this example, the destination queries an authentication server 1350 over the Internet or other network with the serial number 1302 of the unique article in question. The authentication server retrieves the scan parameters from a secure database 1351 associated with the article serial number. The server responds to the destination with a set of challenge parameters for the scanner settings 1305, such as the test magnetic field configurations and microwave frequency parameters, to which the scanner 1304 at the destination should adjust. In this example, the field configurations are sufficient for the destination scanner to determine the set of positions and orientations of each particle 1306 in the unique marker with respect to a coordinate system centered in the host film. The destination scanner performs the series of scans similar to those completed at the origin. It then provides a response to the authentication server 1350 with the set of measured positions and orientations 1306 and serial number to the authentication server. The authentication server 1350 has knowledge of the positions and orientations associated with the serial number and stored in the database 1351 and obtained from the initialization scan at the origin scan. The server 1350 compares the orientation and position maps and performs the calculation of the overlap of the two sets (the initialization scan and the destination scan) and determines if the sets are close enough to be considered an authentic match. In this example, the server 1350 responds with one of two outcomes 1307: Pass if the closeness criterion is met, and Fail for all other outcomes.

A single destination point of a unique article is given as an illustrative example for the first example. For particular applications and use cases (e.g., bank note authentication) a single destination point may not exist as the unique article may continue to circulate between various parties and destination points. In addition, the destination may not be at a physically separate location; unique articles can be initialized, stored and authenticated at a single physical site in a variation of the aforementioned authentication method.

In a second example, the origin scan of the article starts and commences as described in the first example above 1200. At the destination, the unique article is received and the unique marker, as well as the serial number are retrieved from the article. In this second example, the scanner has a magnetic field that is not changeable but is of a magnitude and orientation known to the authentication system. The scanner unit is identified by a scanner serial number. With this single magnetic field configuration, the destination scanner performs a scan by capturing successful fluorescence images of the unique marker, each with a different microwave frequency specified. The image positions and magnetic resonance frequencies of each particle are recorded. This information is sent to the authentication server along with the article serial number and the scanner identification number.

In this example, the authentication server knows the particle positions and orientations of the unique marker associated with the serial number as captured during the initialization scan. The authentication server can calculate the expected magnetic resonance response for this particular unique marker by having knowledge of the applied magnetic field. Since the magnetic field associated with the scanner serial number provides this information by using a mathematical model for the NV center, the authentication server can determine the expected magnetic resonance response for the combination of serial number and scanner serial. The expected magnetic resonance response is equivalent to obtaining partial and incomplete orientation of the particle. The scan information (particle positions and resonance frequencies) is sent to the authentication server from the destination and compared with the model calculated values. Using a similar thresholding criteria with single parameter e as described above, the unique marker is deemed an authentic match for the combination of article serial number and scanner serial number if the partial scan at the destination is sufficiently similar to the calculated partial scan at the authentication server.

In some instances, the authentication techniques described here may offer significant advantages. For example, a hierarchical system for identifying a physically unique distribution of fluorescing particles in 1-, 2- or 3-dimensions may be used. Not only is the position of the particles used, but the random orientation of the particles with respect to one another is used for the unique identification. Cloning a physical fingerprint using both position and orientation information may be impractical or even impossible, for example, using nanopositioning tools, such as an atomic force microscope, to perform a particle-by-particle pick-and-place procedure to recreate a fingerprint.

In addition to the orientation, other physical properties of the particles can optionally be observed from the fluorescence that add to the security, uniqueness, and unclonability of a unique marker in some cases. These properties can include, but are not limited to, crystal strain of each particle, spin dephasing times (e.g., T2 times) of each particle, unique signatures of magnetic noise local to individual particle environments, unique signatures of electric field noise local to individual particle environments, unique resonance signatures of local nuclear spin ensembles in particles (e.g., hyperfine splitting), and unique signatures of fluorescence lifetime due to local dipole fields resonant with the dipole energy of fluorescence (FRET).

In some cases, the techniques described here may avoid the need to rely on spectral signatures of fluorescence. Measuring spectral signatures with small changes in wavelength involves large diffraction gratings and long reflection paths limiting the practical usage of these fingerprinting methods, especially in field deployable situations.

In some implementations, in conjunction with or separate from measurement of the magnetic resonance response of the color-centers in the particles, the fluorescence intensity of the particles can be used to gain information about particle orientation. For some magnetic field strengths in the NV-color center, such as those above a few hundred Gauss, it is observed that the fluorescence response "quenches" when a large magnetic field component is applied orthogonal to the NV-center symmetry axis. This technique enables gaining orientation information without the use of RF or microwaves.

In some cases, an additional layer of security can be provided by the addition of a magnetic particles or markers to, or near, the UM. One example of a magnetic marker is a thin polymer film containing magnetized superparamagnetic iron-oxide particles. In such cases, the destination scanner approaches the unique marker under test to the magnetic marker, whereby the magnetic domains or particles on the surface generate a local magnetic field across the field of view for scanning the unique marker. The unique marker is imaged in the manner described above and the magnetic resonance response is recorded. Magnetic markers may be considered unique by the same criteria for uniqueness set forth earlier in this document for unique markers. A unique magnetic marker is characterized beforehand and information about the magnetic field (magnitude and orientation) of the marker is stored at the authenticator 1350. With this information the authenticator can calculate the anticipated response for a given scanner unique magnetic marker's identification number and the unique marker's serial number. The measured response at the destination scanner and the calculated response are analyzed for their similarities and the authentication is determined by aforementioned threshold criteria.

In some implementations, the unique magnetic marker and the unique marker are fused into a combined physical marker. The magnetic particles (MP) can be embedded in the article, e.g., below the UM. The MP creates a particular magnetic field pattern near the UM. If the UM is removed or shifted from the original location the article, the authentication will fail. In some implementations, the MP can be incorporated in the adhesive of the UM or in the suspension medium of the article.

In some implementations, the unique marker can serve as a physically unclonable function (PUF). PUFs operate by a challenge/response behavior whereby some parameters of the system can be varied (I.e., the challenge) and the response of the physical system to those parameters can be easily measured. Due to intrinsic randomness in the device PUFs are difficult to clone. The randomness makes it difficult to predict the response of the physical system (i.e., function output) based on the input (i.e., challenge) parameters as well. The unique marker can act as a PUF when placed in a parametrically controlled magnetic environment. As an example, the local magnetic field strength and orientation can be varied by setting parameters, such as currents in a collection of tiny coils. The currents give rise to magnetic field inside the PUF. The PUF challenge might be a set of current values for the coils and the PUF response would be the resonance frequency response for each particle within the unique marker.

In some implementations, the challenge parameters for setting the magnetic field need not be communicated between a destination scanner and the authenticator for each scan. Instead, the authenticator knows of a unique random key seed installed at destination scanner. The authenticator and the destination scanner also share a common synchronized clock. The destination scanner then uses the clock value and the random seed as inputs to a one-way (e.g., hash) function whose output parameters set the magnetic field parameters. In such a scheme, the authenticator can determine the magnetic field parameters from the mutual information known to both the scanner and authenticator and perform the threshold matching. Such randomization of the scanner parameters adds an additional layer of security.

In some implementations, the UM can be used as a unique fingerprint or a physically unclonable function (PUF) for authentication and encryption. The orientation pattern generates a random bit string key that is used to encode a message or as a seed to another encryption protocol.

In some implementations, instead of the authenticator providing a simple pass/fail message for authentication, the authenticator provides the destination with the expected scanner response. The authenticator responds with a message containing the partial orientation information for the scanner/tag pair as calculated from the scanner serial number and the complete orientation information of the UM captured at the initialization scan at the origin during attachment to the article. The destination scanner does not send its measurements to the authenticator, but instead validates the scan it measures with the expected response provided by the authenticator. The destination compares the message with the scan information and authenticates the object if the response satisfies the threshold criteria. The authentication step of comparing the origin data and the destination data can be done at the destination or in a system that receives the data from both scanners.

In some implementations, the unique marker can also be intentionally altered in its physical composition upon leaving the origin scan. As an example, the scanner or another device may alter or modify the UM. Those alterations can be done by physical deformation of the UM or by heating it above a set temperature. For example, a laser beam can be used to heat an area in the UM and reflow the suspension medium such that the orientation and position of the particles changes. A full and complete alteration can be used for marker reset such that previous scanners will not match future scanners. In other words, the marker is reinitialized without the original scanner (or any prior system) having information about the UM new configuration.

In some implementations physical alteration can also be used to destroy a UM after use (for single use applications). For example, the UM may be used to authenticate a seal on a package (e.g., as tamper-free evidence). The seal is broken when the package is opened and the UM is no longer needed. To avoid attempts to reuse the marker, such as to attach an authentic UM to a non-unique article, the UM can be destroyed.

In some implementations, partial physical alteration may also be used for securing the chain of custody of the UM. As an example, a scanner (e.g., a destination scanner) may alter the UM partially to introduce a variation to some of the marker properties, such as the particle positions and orientations in one region of the marker. These modifications are measured at the modifying scanner and may be stored locally or externally depending on the application needs. This can be used as a ledger to record scan events directly on the UM. The UM contains enough information to authenticate the marker but includes additional space/information/particles to allow for the recording and authentication of the modified sections of the UM. This can be done multiple times on the same UM. For example, this technique can be used for tracking of an article in a supply chain where different checkpoints scanners are used.

In some implementations, the UM is used as an encryption key whereby the unique marker is physically altered at the destination where the encrypted data is stored. The knowledge of the UM orientation may be known at time of manufacture, but can be altered by the scanner at the point of encryption to deny other parties with prior custody of the UM future knowledge of the key. The unclonability of the key prevents surreptitious accessors from copying the key on site. In some examples, a device accepting cleartext (unencrypted) data requires a UM as a key for symmetric encryption/decryption.

In addition to the application of the unique markers described herein for authentication of goods, the unique markers can have other applications. One example of an alternative application is multi-factor authentication. The unique marker is unclonable and knowledge of its properties can be stored with an authentication server. A user seeking to authenticate a transaction, event, object, data, etc. can provide both this physical marker (a key) and a password for proving his/her identity. In another example, the user password is used to generate a particular predetermined magnetic pattern in the scanner device and thus providing an additional layer of security. The user ID, Scanner ID and marker scan is shared with the authentication system. This is similar to a hardware security token with the exception of it not needed to be powered, but requiring a dedicated reader device.

Another alternative example application is generation of random bits used as encryption keys. The orientation and position information of a given unique marker can be used to generate random bit strings used for encryption. Provided that the data associated with the unique marker is intentionally not stored, but only used at an origin location to derive the random string, the physically unclonable key would be required to decrypt the information.

Figure 14:
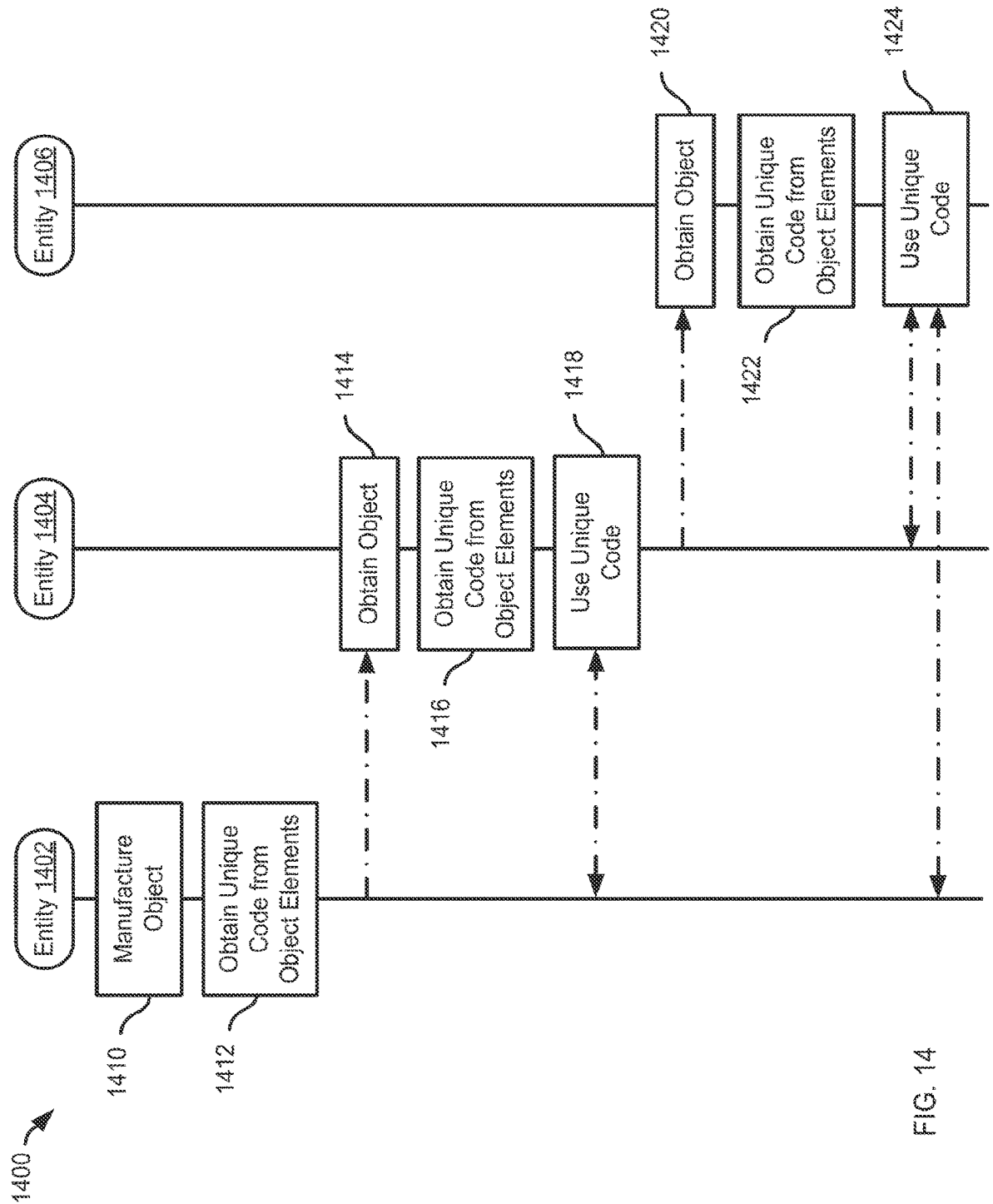
FIG. 14 is a flow diagram schematically illustrating an example process for using orientation information extracted from an object.

FIG. 14 is a flow diagram schematically illustrating an example process 1400 using orientation information extracted from an object. The example process 1400 may include additional or different operations, including operations performed by additional or different entities, and the operations may be performed in the order shown or in another order. In some cases, one or more of the operations shown in FIG. 14 are implemented as processes that include multiple operations, sub-processes or other types of routines performed by one or more systems. For example, the systems, components and processes shown in FIG. 1A, 11B, 2A, 2B, 3-8, 9A, 9B, 10, 11A, 11B, 12, 13 or 15 can be used, in some instances, to perform one or more of the example operations shown in FIG. 14. In some cases, operations can be combined, performed in parallel, iterated or otherwise repeated or performed in another manner.

FIG. 14 shows the example process 1400 performed by three entities: a first entity 1402, a second entity 1404 and a third entity 1406. The entities shown in FIG. 14 may represent distinct entities in a manufacturing process, an industrial process, a supply chain, a distribution channel, a financial process, a corporate workflow or another type of process. As shown in FIG. 14, each entity obtains a unique code from the elements of the same object, and the unique code is then used by the entity.

In some cases, the object in the example process 1400 can be or include a unique marker (UM), for instance, of the type described above. For instance, in some implementations the object can be the sneaker 101 or the unique marker 103*a* shown in FIG. 1A, the unique marker 401 shown in FIG. 4, the article 1202 or the unique marker 1201 shown in FIG. 12, the unique article 1301 or the unique marker 1303 shown in FIG. 13. In some cases, the object can be or include another type of unique marker (UM) or another type of system, device or component that includes a UM. In some cases, the object can be or include a tamper-evident device that can be used to verify the integrity of a structure.

In some examples, the first entity 1402 is a component manufacturer, the second entity 1404 is a system manufacturer, and the third entity 1406 is a retail distributor. The object can be the component (or part of the component) manufactured by the first entity 1402, and the second entity 1404 can incorporate the component from the first entity 1402 into a product that is sold or distributed by the third entity 1406. The second and third entities 1404, 1406 can use the unique code, for example, to track and trace the component or to authenticate the source, the type or another attribute of the component. As an example, the component could be a battery, a chipset, or another part for a consumer electronics device, a medical device, etc.

In some examples, the first entity 1402 is a manufacturer or printer of commercial documents, and the second entity 1404 and the third entity 1406 are financial institutions. The object can be the commercial document (or part of the commercial document) manufactured by the first entity 1402. The unique code can be used, for example, to authenticate the source, the type or another attribute of the commercial document. Examples of commercial document include cash, coins and other currency or bank notes, checks, bonds, stock certificates, etc.

In some examples, the first entity 1402 is a manufacturer of pharmaceuticals, medical devices or healthcare equipment, the second entity 1404 is a distributor and the third entity 1406 is a healthcare provider. The object can be the pharmaceutical, medical device or healthcare equipment (or packaging for, or a component of the pharmaceutical, medical device or healthcare equipment) that is manufactured by the first entity 1402 and distributed to health care institutions by the second entity 1404. The second and third entities 1404, 1406 can use the unique code, for example, to authenticate the source, the type, the intended recipient (e.g., a specific patient) or another attribute of the medical device or healthcare equipment. As an example, the medical device could be a prosthetic device or implant manufactured or allocated for a particular patient.

In some examples, the first entity 1402 is a manufacturer of containers (e.g., vials, bottles, bins, shipping containers, etc.), the second entity 1404 places some contents into the containers and entrusts the containers to the third entity 1406 for storage, analysis, transport, processing or another purpose. The object can be the container (or part of the container) that is manufactured by the first entity 1402 and provided to the second entity 1404. The second and third entities 1404, 1406 can use the unique code, for example, to authenticate the identity or contents of each individual container. As an example, the unique code could be used to authenticate a biological sample of an individual patient, a type of prescription drug or other sensitive contents. As another example, the unique code could be used to verify a tamper-evident component of the container, for instance, to determine whether the container or its contents have been tampered with.

In some examples, the unique code can be used to verify that the object is authorized for handling or use by a specific entity or a group of entities, for example, entities in a specific geographical region or entities with proper credentials.

At 1410, the first entity 1402 manufactures an object. In some implementations, another entity (other than the first, second or third entities 1402, 1404, 1406 shown in FIG. 14) manufactures the object at 1410 and then provides the object to the first entity 1402. The object may be manufactured by multiple entities in multiple locations, and the manufacturing performed at 1410 may represent one manufacturing process within an overall manufacturing workflow.

In the example shown in FIG. 14, when the object is manufactured, a suspension of elements is formed in the object. Here, the suspension of elements can be formed on a two-dimensional surface of the object, within an three-dimensional volume of the object, or both. In some cases, the suspension is formed in the object by distributing the elements on a surface (e.g., an external surface, an internal surface, or both) of the object. In some cases, the suspension is formed in the object by distributing the elements in a medium of the object (e.g., in the material that the object is made of). The elements can be fixed in the suspension, for instance, so that the elements remain static relative to each other and relative to the medium of the object. For example, the suspension can be a static spatial distribution of elements, in which the relative locations, orientations, sizes, magnetic environments and other properties of the elements can remain fixed. In some implementations, the elements are fixed in the suspension as long as the shape and structure of object remains unchanged; and the elements can be modified in the suspension, for example, by deforming or otherwise changing the object, to modify the relative locations, orientations, sizes, magnetic environments and other properties of the elements.

In some examples, the elements are diamond particles, and a suspension of diamond particles is formed in the object when the object is manufactured at 1410. The suspension of diamond particles can be of the type in the host material 301 shown in FIG. 3 or another type of suspension. The suspension of diamond particles may be formed, for instance, by manufacturing systems that use source materials that contain diamond particles. For example, the manufacturing systems may include injection molding systems, additive manufacturing systems, printers, paint application systems, saws, lathes, mills, and other manufacturing systems. In some cases, the manufacturing systems may also include a mixer or another type of system that mixes or otherwise distributes the diamond particles into a source material.

The suspension of diamond particles may be formed, for example, by distributing the diamond particles on a surface of the object. The diamond particles may be distributed on the surface of the object, for instance, by mixing the diamond particles into a liquid, gas or other fluid medium, and applying the liquid, gas or other fluid medium to the surface of the object. In some cases, the diamond particles can be mixed with aerosol paint in a pressurized container, and the aerosol paint can be sprayed onto a surface (interior, exterior or both) of the object. In some cases, the diamond particles can be mixed with latex-based paint, oil-based paint, or another type of paint that is brushed, rolled, sprayed or otherwise applied to a surface (interior, exterior or both) of the object. In some cases, the diamond particles may be distributed on the surface of the object by spin or dip coating processes used in semiconductor manufacturing.

The diamond particles may be distributed on the surface of the object, for instance, by mixing the diamond particles into conformal coating material, and applying the conformal coating material to the surface of the object. The conformal coating material may include an acrylic, silicone, urethane, or parylene material or another material of the type that is typically applied to electronic components (e.g., printed circuit boards, etc.). The conformal coating material can be sprayed, brushed or otherwise applied to a surface (interior, exterior or both) of the object.

The diamond particles may be distributed on the surface of the object, for instance, by mixing the diamond particles into toner or ink material (e.g., in a printer cartridge), and printing the toner or ink material on the object. The toner or ink material may include material of the type that is typically used in ink-jet printers, laser printers, etc. The toner or ink material can be printed on paper, fabric or other material that forms all or part of the object, for example, by a conventional printer or another type of system.

The suspension of diamond particles may be formed, for example, by distributing the diamond particles in a material and forming the object from the material. The diamond particles may be distributed in the material, for instance, by mixing the diamond particles into a liquid, gas or other fluid medium, and forming the object from the liquid, gas or other fluid medium. For example, the diamond particles can be mixed with source material (e.g., liquid or resin thermoplastic material, melted glass material, melted metal material, etc.), and the source can be used in an injection molding process or additive manufacturing process to form the object. In a typical injection molding process, the heated source material is injected at high pressure into a cavity defined by a mold, and the source material conforms to the mold and then cools and hardens in the shape of the cavity. In a typical additive manufacturing process, the source material is deposited in successive layers according to a computer model, and the layers are built up to form the object. The additive manufacturing process may be performed, for example, by a conventional 3D printer or another type of system.

The diamond particles can be mixed with source material (e.g., liquid or resin thermoplastic material, melted glass material, melted metal material, etc.), and the source can be cooled or otherwise processed to form a solid workpiece from which the object is formed. For instance, the workpiece can be a plastic, metal or other type of solid workpiece, and the object can be formed by removing material (e.g., cutting, filing, sanding, milling, drilling, stamping, machining, etc.) the workpiece. In some cases, conventional equipment (e.g., saws, files, lathes, mills, drills, etc.) can be used to machine the workpiece, for instance, in a subtractive manufacturing process.

In some cases, the manufacturing process may control the density, sparseness or number of elements in the object. For example, the object may be manufactured to have diamond particles filling less than a threshold percentage (e.g., less than 20%, less than 10%, less than 1%, etc.) the object's volume. In some cases, the density (e.g., mass density, volume density) of elements in the object is controlled in a manner that allows the individual elements to be identified by an imaging system, for instance, so that a fluorescence image of the object contains a sparse constellation of diamond particles.

At 1412, the first entity 1402 obtains a unique code from the elements of the object. For example, when the elements are diamond particles, the first entity 1402 may use the suspension of diamond particles to generate a unique code for the object. The first entity 1402 can obtain the unique code, for example, according to the example process 1500 shown in FIG. 15 or another type of process. In some examples, the unique code can be based on (e.g., the unique code may be, include, be derived from, etc.) orientation information (e.g., the orientation information 1206 shown in FIG. 12, the orientation information 1306 shown in FIG. 13) or another type of element information (e.g., magnetic environment information, topographical information, location information, etc.) extracted from the object. In some implementations, the unique code is obtained by a scanner system that extracts the element information and a computer system that generates the unique code from the element information. For example, when the object includes a suspension of diamond particles, the element information may describe the orientations, locations, magnetic environments, or sizes of the respective diamond particles in the suspension, or the object information may describe any combination of these properties of the respective diamond particles in the suspension.

At 1414, the second entity 1404 obtains the object. The second entity 1404 may obtain the object directly from the first entity 1402 or indirectly through an intermediary entity. For example, the object may be handled by a delivery service, customs or transport officials, another entity in a supply chain, etc. In some cases, the object may pass through one or more intermediate owners, trustees or other entities over a period of days, months or years between the first entity 1402 and the second entity 1404.

At 1416, the second entity 1404 obtains a unique code from the elements of the object. The second entity 1404 can obtain the unique code, for example, according to the example process 1500 shown in FIG. 15 or another type of process. In some implementations, the second entity 1404 obtains the unique code using the same process that the first entity 1402 used to obtain the unique code. For instance, the second entity may have access to the same type of scanner equipment, and the unique code may be obtained by a protocol that is known to both the first entity 1402 and the second entity 1404.

In some cases, a protocol for obtaining the unique code from the object includes parameters (e.g., magnetic field strength, illumination intensity, scanner settings or other types of parameters), and the unique code produced by an execution of the protocol depends on the properties of the object and the values of the parameters. In some cases, the first entity 1402 selects the values of the parameters that it used (at 1412) to extract the unique code, and the second entity 1404 uses the same values (at 1416) to extract the unique code. For example, the values may be provided with the object, obtained separately from the first entity 1402, received from a trusted third party, obtained from a public database or otherwise procured by the second entity 1404. In some cases, the second entity 1404 independently selects the values of the parameters that it uses (at 1416) to extract the unique code, for example, by selecting the values randomly, by using pre-defined values, or otherwise independent of the values used by the first entity to obtain the unique code (at 1412).

In some instances, the first and second entities 1402 and 1404 obtain the same unique code at 1412 and 1416, respectively. For example, when the elements of the object have not been altered, and the extraction protocol is executed properly, the unique code obtained by the second entity 1404 (at 1416) may be identical to the unique code obtained by the first entity 1402 (at 1412). In some instances, the first and second entities 1402 and 1404 obtain different unique codes at 1412 and 1416, respectively. For example, when the elements of the object have been altered, or the extraction protocol is executed improperly, the unique code obtained by the second entity 1404 (at 1416) may be different from the unique code obtained by the first entity 1402 (at 1412).

At 1418, the second entity 1404 uses the unique code. In some implementations, the unique code is used in a process for authenticating the object, tracking the object, verifying integrity of the object, or another type of process related to the object. As an example, the unique code can be the orientation information 1306 in FIG. 13 that is used to authenticate the unique article 1301. In some implementations, the unique code can be used in a process that is otherwise unrelated to the object. In some instances, the unique code can be used as a quality measure, as a security measure, and as an inventory management tool. In some cases, the unique code can be used to demonstrate regulatory compliance or for other purposes.

In some implementations, the second entity 1404 communicates with the first entity 1402 (or another entity) to use the unique code at 1418. In some cases, the first and second entities 1402, 1404 communicate with each other directly, for example, over a communication channel or a direct communication link. Example communication channels include wired or wireless connections (e.g., radio connections, optical or electrical connections, etc.), wired or wireless networks (e.g., a Local Area Network (LAN), a Wide Area Network (WAN), a private network, a public network (such as the Internet), a peer-to-peer network, a cellular network, a Wi-Fi network, etc.), other physical connections (e.g., pneumatic tubing, acoustic media, etc.) and others. In some cases, the first and second entities 1402, 1404 communicate with each other indirectly, for example, through access to a shared database or other resources, through an intermediate entity, through an escrow channel or otherwise. In some implementations, using the unique code at 1418 does not require the second entity 1404 to communicate with the first entity 1402 or any other entity. For instance, the unique code can be used in a process (e.g., a security process or another type of process) that is executed internally by the second entity 1404.

In some implementations, the unique code is used in an authentication process. For instance, the second entity 1404 may execute the operations of the requester 1602 in the example authentication process 1600 shown in FIG. 16. In some cases, the authentication process includes or is implemented as a challenge-response process, such as, for instance, the example challenge-response process 1700 shown in FIG. 17. An authentication process can be used for anti-counterfeiting, integrity verification, identity verification, chain of custody verification or another purpose. The authentication process can produce an output that indicates the authenticity of the object, for example, as a binary ("pass" or "fail") or as a graded value (e.g., as a percentage, likelihood or probability).

For anti-counterfeiting, the unique code can be used to authenticate the object, for instance, to determine whether a purported source, grade, type or quality of the object is genuine (i.e., authentic) or counterfeit (i.e., inauthentic). A product manufacturer may authenticate a product component, for example, to determine whether the product component was manufactured by a particular component manufacturer. A retailer may authenticate a branded product, for example, to determine whether the branded product was produced by the indicated brand source or an authorized manufacturer. A bank may authenticate a currency item, for example, to determine whether the currency item was issued by a particular financial institution or government. Authentication processes can be used for other types of anti-counterfeiting.

For integrity verification, the unique code can be used to authenticate the object, for instance, to determine whether the object has remained intact (i.e., authentic) or has been compromised or tampered with (i.e., inauthentic). A distributor or end user may authenticate a product, for example, to determine whether a product seal was disturbed, a component was disassembled or replaced (e.g., if a mounting screw was disturbed) or the object was otherwise tampered with. A pharmacy may authenticate a compound, for example, to determine whether a packaging or container has been tampered with. Authentication processes can be used for other types of integrity verification.

For identity verification, the unique code can be used to authenticate the object, for instance, to determine whether the object is associated with a particular identity or identifier of a person or other entity (e.g., corporate entity, government entity, etc.). A hospital may authenticate a prescription drug container, for example, to determine whether the contents are associated with a particular prescription or patient. A healthcare provider may authenticate a prosthetic device or implant, for example, to determine whether the device or implant is associated with a particular patient or procedure. Authentication processes can be used for other types of identity verification.

For chain of custody verification, the unique code can be used to authenticate whether the object has been in possession of one or more entities. A corporate entity may verify chain of custody of sensitive products or information, for instance, to ensure confidentiality before deploying in a secure internal process. Law enforcement entities may verify chain of custody of physical evidence, for instance, to ensure integrity of an investigation. Authentication processes can be used for other types of chain of custody verification.

The authentication process may produce a result that the second entity 1404 can act on. As an example, if the authentication process indicates that the object is authentic (e.g., with a binary indicator, with a grading above an acceptable threshold, etc.), then the second entity 1404 may accept and deploy the object. For instance, a component may be installed, a drug may be administered, a financial instrument may be accepted as payment, etc. As another example, if the authentication process indicates that the object is inauthentic (e.g., with a binary indicator, with a grading below an acceptable threshold, etc.), then the second entity 1404 may reject or quarantine the object. For instance, a component may be returned, a drug may be disposed, a financial instrument may be declined as payment, etc.

In some implementations, the unique code is used in cryptographic process. For instance, a key (e.g., a private key, a shared secret, etc.) or another value for a cryptographic process may be generated based on the unique code (e.g., the unique code may be used as or used to derive the key). The unique code can be used for message authentication (e.g., signing, verifying), message encryption (e.g., encrypting, decrypting), key derivation (e.g., producing session keys, ephemeral keys, etc.) and other cryptographic applications.

In some implementations, the first and second entities 1402, 1404 can use the unique code as a shared secret, for example, similar to the type of shared secret produced by a cryptographic key agreement algorithm (e.g., Diffie-Hellman, quantum key distribution (QKD), or another algorithm). The second entity 1404 may use the shared secret in an encrypted communication session over a public channel, for instance, to encrypt messages to the first entity 1402 or to decrypt messages from the first entity 1402. The second entity 1404 may use the shared secret in an authenticated communication session over a public channel, for instance, to sign messages to the first entity 1402 or to verify messages from the first entity 1402.

In some implementations, the second entity 1404 can use the unique code as a private key and generate a related public key, for example, for use in a public key infrastructure (PKI) system. For example, the second entity 1404 can use the private key to decrypt messages that have been encrypted by another entity using the public key. As another example, another entity can use the public key to verify messages that have been signed by the second entity 1404 using the private key. Example PKI systems include RSA-based systems, elliptic curve systems, and others.

In some implementations, the object is used as (or in connection with) a ledger (e.g., a secure ledger, a public ledger, a distributed ledger or another type of ledger), and the unique code is used as (or is used to generate) an entry or update in the ledger. For instance, a first unique code obtained (at 1412) by the first entity 1402 may represent a first entry in the ledger, and a second, different unique code obtained (at 1416) by the second entity 1404 may represent a second, different entry in the ledger. In some cases, the second entity 1404 modifies the object before obtaining the unique code at 1416, which causes the second entity 1404 to obtain the second, different unique code at 1416. For Instance, the second entity 1404 may change the orientations of one or more of the elements of the object, so that orientation information extracted from the object produces a different unique code.

At 1420, the third entity 1406 obtains the object. The third entity 1406 may obtain the object directly from the second entity 1404 or indirectly through one or more intermediary entities.

At 1422, the third entity 1406 obtains a unique code from the elements of the object. The third entity 1406 can obtain the unique code, for example, according to the example process 1500 shown in FIG. 15 or another type of process. In some implementations, the third entity 1406 obtains the unique code using the same process that the first entity 1402 or the second entity 1404 (or both) used to obtain the unique code. In some instances, the first, second and third entities 1402, 1404 and 1406 obtain the same unique code at 1412, 1416 and 1422, respectively. For example, when the elements of the object have not been altered, and an extraction protocol is executed properly, the unique code obtained by the third entity 1406 (at 1422) may be identical to the unique code obtained by the first entity 1402 (at 1412) and the second entity 1404 (at 1416). In some instances, one or more of the first, second and third entities obtains a different unique codes from the other entities.

At 1424, the third entity 1406 uses the unique code. The third entity 1406 (at 1424) may use the unique code obtained at 1422 in a manner that is analogous to how the second entity 1404 (at 1418) uses the unique code obtained at 1416. In some implementations, the third entity 1406 communicates with the first entity 1402 or the second entity 1404 (or another entity) to use the unique code at 1424. For example, an authentication process may be executed between the third entity 1406 and the first entity; the authentication process may be executed directly between the third entity 1406 and the first entity 1402 or through an intermediate entity (e.g., the second entity 1404 or another entity). In some cases, the process 1400 extends to additional entities in a similar manner.

Figure 15:
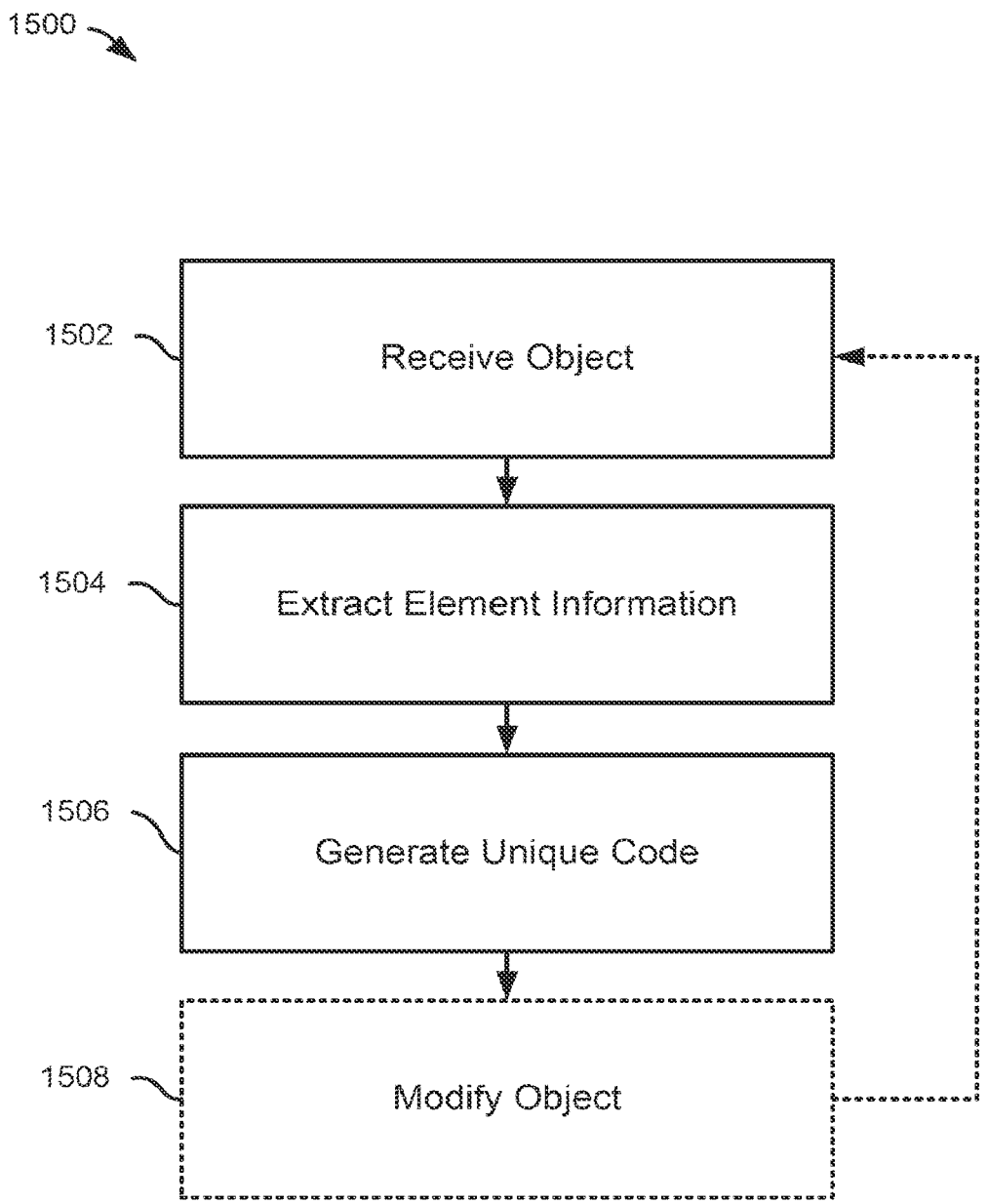
FIG. 15 is a flow diagram schematically illustrating an example process for generating a unique code for an object.

FIG. 15 is a flow diagram schematically illustrating an example process 1500 for generating a unique code for an object. The example process 1500 may include additional or different operations, and the operations may be performed in the order shown or in another order. In some cases, operations can be combined, performed in parallel, iterated or otherwise repeated or performed in another manner.

In some cases, one or more of the operations shown in FIG. 15 are implemented by a scanner system such as, for example, the scanner shown in FIG. 4 or another type of scanner system. The scanner system can be configured to extract information from a sample, for example, by applying a stimulus to the sample and recording the sample's response to the stimulus. The scanner system can include one or more probes that apply the stimulus or record the sample's response (or both). For instance, the scanner system may include an illumination source (e.g., a laser or other light source), optical components (e.g., lenses, mirrors, filters, amplifiers, etc.), optical sensors, cameras (e.g., a CMOS camera, a CCD camera or another type of camera), signal generators (e.g., RF signal generators, microwave signal generators, etc.), coils and antennas, magnet systems (e.g., an electromagnet, a superconducting magnet, etc.) and other components, which may be arranged according to the example shown in FIG. 14 or otherwise.

In examples where the scanner system is configured to inspect color centers of diamond particles, the scanner system includes one or more probes configured to obtain fluorescence images of the sample, for instance, by applying illumination to the sample and detecting the object's fluorescence response (e.g., over a range of applied static magnetic fields, applied static electric fields, etc.). In some examples, the scanner system also includes one or more probes configured to obtain magnetic resonance properties of the sample, for instance, by positioning the sample in an external magnetic field, applying radio or microwave pulses to the sample and detecting the object's response to the pulses. In some examples, the scanner system also includes a sample region where samples reside when they are inspected by the scanner system.

In some cases, one or more of the operations shown in FIG. 15 are implemented by a computer system. For example, the scanner system that extracts information from the sample may include a processer that analyzes the extracted information. Additionally or alternatively, operations may be performed by another computer system. For example, information extracted by a scanner system can be communicated to a separate computer system that is distinct (and in some cases, remote) from the scanner system.

At 1502, an object is received. The object can be received, for example, in a sample region of the scanner system. The object received at 1502 is a physical object that includes elements, for example, elements integrated into the structure of the object or otherwise distributed in the object. The object received at 1502 can be of the type referred to in the process 1400 in FIG. 14. For example, the object can be or include a unique marker (UM) or another item that includes a suspension of elements.

In some implementations, the object is a manufactured system or device (e.g., a container, a document, a medical device, etc.). In some implementations, the object is a component of a manufactured system or device. For instance, the object can be a component (e.g., a label, lid, seal or other component) of a container (e.g., a prescription drug container, a biological sample container, an envelope or other document container, a freight container, etc.), a printed area on a document (e.g., currency, bank note, or other commercial document), a part of a medical device (e.g., a prosthetic device or implant), a tag affixed to a retail good or electronic device, etc.

In some implementations, the object is a macroscopic object and the elements are microstructures or nanostructures of the object. For example, the elements can be diamond particles, magnetic particles, nanorods, microstructures such as flakes or foils, molecules exhibiting electron paramagnetism, molecules with finite electric dipole moments, or other types of structures suspended in the object. The object can have a macroscopic size, for example, having a largest dimension on the order of millimeters, centimeters, or larger; and the elements can have sizes that are one or more orders of magnitude smaller than the object, for example, elements having largest dimensions on the order of millimeters, micrometers or nanometers in some cases. In some examples, the elements are crystalline particles fixed in a medium. The crystalline particles can be, for instance, diamond particles having respective color centers (e.g., NV centers or other types of color centers), and the medium can be an organic or inorganic material. In some cases, crystalline particles can be suspended in silicon, glass, thermoplastics (e.g., acrylic, Acrylonitrile butadiene styrene (ABS), Polyvinyl chloride (PVC), polyethylene), thermosetting polymers (e.g., epoxies and polyurethanes) or other types of material. The object may include hundreds, thousands, millions or more elements. The elements may be dispersed throughout all or part of a volume of the object, dispersed over all or part of a surface of the object or otherwise distributed in the object.

In some implementations, each element has a structure (internal or external) that defines an orientation of the element. For example, an element may have a crystalline structure, and the orientation of the element may be defined by a particular axis (e.g., a symmetry axis) or plane of the element's crystalline structure. As another example, an element may have an elongate structure, and the orientation of the element may be defined by a particular axis (e.g., the long axis) or plane of the element's elongate shape. As another example, an element may have an internal feature or structure (e.g., a color center), and the orientation of the element may be defined by a particular axis (e.g., the NV axis) or plane of the internal feature or structure of the element.

In some implementations, each element is fixed in the object relative to the other elements in the object. For instance, the elements may be secured in the object such that their relative locations and orientations remain fixed as long as the shape and structure of the object remains fixed. Accordingly, the object may inherently define a distribution of element properties that can be detected, in a repeatable and deterministic manner, by detecting the individual elements. For instance, the suspension of elements may define a distribution of relative spatial orientations, a distribution of relative locations, a distribution of sizes and shapes, etc. The distribution of element properties may have thousands, millions or more independent degrees of freedom that can vary in each object.

In some implementations, some or all of the element properties are controlled by a highly complex, random or quasi-random process, for instance, a thermodynamic process that occurs when the object is manufactured. Accordingly, the distribution of element properties in an individual object may be difficult or impractical (or even impossible) to clone or duplicate in another object. Thus, the distribution of element properties can be unique for each individual object, and may serve as a unique identifier of the object, akin to a fingerprint or signature.

At 1504, element information is extracted from the object. The element information can be extracted from the object, for example, by operation of one or more probes of the scanner system. The element information can include, or it can be based on, the distribution of element properties defined by the elements of the object. For instance, the element information can describe a distribution of relative spatial orientations, a distribution of relative locations, a distribution of sizes and shapes, or combinations of these.

In some cases, the element information is extracted by imaging the object using optical microscopy (e.g., as described with respect to FIG. 4) and processing the resulting images. In some cases, the element information is extracted by detecting magnetic resonance properties of the object (e.g., as described with respect to FIG. 4) and processing the magnetic resonance data.

In some cases, the element information is extracted by an extraction protocol performed by the scanner system, and the element information may depend on the element properties and the parameters of the extraction protocol. For instance, the parameters of the extraction protocol may be provided as inputs to a controller or control process (e.g., the main logic module 408 in FIG. 4) that operates the probe(s) of the scanner system. In some cases, the element information extracted from the object does not necessarily depend on the parameters of the extraction protocol. For example, two distinct extraction protocols that identify the orientations of the same elements (e.g., all the elements, or the same subset of elements) may produce the same orientation information, since the orientations are fixed. And the element information can be defined in a standardized or pre-defined format, which may be invariant under global rotations of the objects.

In some implementations, extracting the element information includes extracting orientation information from the object, where the orientation information indicates relative spatial orientations of the respective elements of the object. The orientation information can be formatted as a list, an array or another format. In some cases, the orientation information includes coordinate transformations describing the relative spatial orientations of the respective elements. The coordinate transformations can be, for example, a list of transformation matrices, an order set of orthogonal rotations (such as an Euler decomposition) or coordinate transformations in another form. In examples where the elements are diamond particles, the orientation information can be a list of a composite transformation matrices (e.g. a composite transformation matrix for each diamond particle), and the list of composite transformation matrices can be invariant to global rotations of the coordinate system of the object.

In some cases, the orientation information and possibly other element information (e.g., location information, size information, shape information) is extracted by obtaining an optical response (e.g. a fluorescence response or another type of optical response) to illumination applied to the object. The optical response may include Raman scattering or another nonlinear effect (e.g., second harmonic generation, spontaneous parametric down conversion, etc.) in some cases. In some examples, a fluorescence response can include electromagnetic signals, for example, in the range of 635 nm-800 nm or another wavelength, produced by a color center or another feature of an element (e.g., stokes and anti-stokes shifts or another nonlinear process). Fluorescence images of the object can be generated based on the fluorescence responses of the elements, and the relative spatial orientations can be determined from the fluorescence images. The image 500 shown in FIG. 5 represents an example of a monochrome fluorescence image with 1-bit color depth. The orientation information may be determined based on fluorescence changes in the object, for example, fluorescence changes of the elements detected in response to changes in the illumination or changes in a field applied to the object. In another example, the orientation information can be determined based on the orientation dependence of a nonlinear optical process (e.g., second harmonic generation (SHG)).

In some cases, the orientation information and possibly other element information (e.g., magnetic environment information) is extracted using magnetic resonance techniques such as, for example, electron spin resonance (ESR), nuclear magnetic resonance (NMR), optically detected magnetic resonance (ODMR) or another type of magnetic resonance technique. For example, a scanner can obtain a magnetic resonance response to an oscillatory electromagnetic field (e.g., radio frequency, microwave frequency, etc.) applied to the object, and a computer system can determine the relative spatial orientations by analyzing the magnetic resonance responses. The magnetic resonance response can be obtained, for example, by positioning the object in an external magnetic field (e.g., a static external field), applying the oscillatory electromagnetic field (e.g., applying radio or microwave frequency pulses) to the object in the external magnetic field, and optically detecting magnetic resonance changes of the elements in response to relative changes in the external magnetic field (e.g., relative changes in the strength or orientation of the external magnetic field), relative changes in the oscillatory electromagnetic field (e.g., relative changes in the amplitude, frequency, or phase the oscillatory electromagnetic field).

In some implementations, the orientation information can be extracted independent of registering the object, for example, relative to the scanner system. In some cases, the object does not include registration markings or orientation references other than the elements themselves. When the orientation information is extracted by applying illumination to the object, the orientations of the elements can be described relative to each other, without reference to the angle of illumination. Similarly, when the orientation information is extracted by magnetic resonance techniques, the orientations of the elements can be described relative to each other, without reference to the angle of an applied magnetic field. Accordingly, the orientation information can be invariant to global rotations of the coordinate system of the object.

When the crystalline particles are diamond particles that have respective color centers, the orientation information can be extracted by detecting relative orientations of the color centers. Relative orientations can be detected, in some cases, by processing fluorescence images, magnetic resonance data or other measurements of the object. For example, the relative orientations can be identified using coordinate transformations, for instance, a composite transformation matrix that represents multiple transformations for each diamond particle (e.g., as described with respect to FIGS. 6 and 7). A composite transformation matrix for a diamond particle can represent a first transformation between a coordinate system of the object and a coordinate system of the diamond particle, and a second transformation between the coordinate system of the diamond particle and a coordinate system of a color center in the diamond particle. In some examples, each diamond particle includes a single color center (e.g., each individual diamond particle contains a single NV center). In some examples, some or all of the diamond particles include multiple color centers (e.g., each individual diamond particle contains two or more NV centers). When a single diamond crystal includes multiple NV centers, the four-fold symmetry of the diamond lattice means that any of the four orientations can be chosen as a reference to describe the orientation of the particle.

In some implementations, extracting the element information includes extracting location information from the object, where the location information indicates relative spatial positions of the respective elements of the object. The location information can be formatted as a list, an array or another format. In some cases, the location information includes a list of coordinate vectors describing the relative spatial positions of the respective elements. Relative locations can be detected, in some cases, by processing fluorescence images, magnetic resonance data or other measurements of the object. For example, the relative locations can be identified using as described with respect to FIG. 5 or in another manner.

In some implementations, extracting the element information includes extracting topographical information from the object, where the topographical information indicates relative spatial topographies (e.g., relative sizes, relative shapes, etc.) of the respective elements of the object. The topographical information can be formatted as a list, an array or another format. In some cases, the topographical information includes a list of coordinate vectors describing the dimensions (e.g., along one or more coordinate axes). The topographies of the elements can be detected, in some cases, by processing fluorescence images, magnetic resonance data or other measurements of the object.

In some implementations, extracting the element information includes extracting magnetic environment information from the object, where the magnetic environment information indicates the magnetic environments of the respective elements of the object. The magnetic environment information can be formatted as a list, an array or another format. In some cases, the magnetic environment information includes a list of coordinate vectors describing the magnetic field strength (e.g., along one or more coordinate axes) experienced by each element. The magnetic environment of the elements can be detected, in some cases, by processing magnetic resonance data or other measurements of the object.

The element information may indicate the properties of the elements, for example, in two or three spatial dimensions. For example, the orientation information may indicate the relative spatial orientations in a two-dimensional space or a three-dimensional space; likewise, the topographical and location information may indicate the relative locations, sizes, shapes, etc. in a two-dimensional space or a three-dimensional space. In examples where the elements are crystalline particles fixed in another medium of the object, the element information can indicate the relative sizes, shapes, orientations, or positions of the crystalline particles, or combinations of these properties, for example, in two or three spatial dimensions.

At 1506, a unique code is generated from the element information. The unique code may be generated, for example, by a processor in the scanner system, by a computer system that is separate from the scanner system, or a combination of them. For example, another computer system may obtain the element information (orientation information, location information, topographical information, magnetic environment information or combinations of these) and generate the unique code.

In some implementations, the unique code is generated from orientation information that a scanner system extracted from the object, and the unique code does not depend on any registration or relative orientation between the object and the scanner system. For instance, the orientation information may be processed independent of the relative orientation between the object and the scanner system. When the orientation information is extracted by applying illumination to the object, the unique code may be determined without reference to the angle at which the illumination is applied to the object. Similarly, when the orientation information is extracted by magnetic resonance techniques, the unique code may be determined without reference to the angle at which the external (static or oscillatory) magnetic field is applied to the object.

In some implementations, the unique code is generated from element information representing only a subset of the elements in the object. For example, the object may include a superset of elements, and the element information that is used to generate the unique code may represent only a subset of the elements (less than all the elements).

In some cases, the element information extracted at 1504 indicate properties of only the subset of elements, and the unique code is generated at 1506 from all of the element information extracted at 1504. For instance, the subset of elements could be the elements that respond to a stimulus in a particular range of field strength, frequency, polarization, etc. As an example, when the elements are diamond particles, a camera may be used to observe only the diamond particles with an optical response to a specific frequency band, for example, 2.77 to 2.79 GigaHertz (GHz) or another frequency band.

In some cases, the element information extracted at 1504 indicate properties of all elements in the superset, and the unique code is generated at 1506 from a subset of the element information extracted at 1504. For instance, a subset of orientation information, which indicates relative spatial orientations of the subset of the elements, may be identified from the full set of element information, so that the unique code can be generated based on the relative spatial orientations of only the subset. The subset of elements could be the elements in a particular region of the object, the elements that produce a particular signal strength, or another subset of elements.

The unique code can include information in any suitable form or format, and may be generated by processing the element information in any suitable manner. For example, the unique code can be binary or alphanumeric, or it may include other types of symbols or values. The unique code may be formatted as a single value or a collection (e.g., a list, an array, etc.) of values or another format. As an example, when the orientation information includes a list of coordinate transformations, the list may be processed or reformatted to define the unique code. In some cases, a function or transformation is applied to the element information to generate the unique code.

In the example process 1500, the unique code generated at 1506 is unique to the object. For instance, the unique code may be defined by parameters in a phase space that is sufficiently large that no two objects would produce the same code, in a practical sense. The size of the phase space can be defined, for example, by the number degrees of freedom in the element information extracted from the object. The likelihood that another object (manufactured by the same process, using the same materials, etc.) would occupy the same position in phase space may be infinitesimally small. In some cases, it would be impractical to produce another object that would produce the same would occupy the same position in phase space and produce the same code.

At 1508, the object may be modified. For example, modifying the object may change the relative spatial orientations or spatial locations (or both) of at least some of the elements. The process 1500 may be repeated, for example, after modifying the object 1508 or at other instances. In some cases, on a first iteration of the process 1500, a first unique code for the object is generated; on a second iteration of the process 1500, a second, different unique code is generated for the same object based on orientation information extracted from the object after changing the relative spatial orientations. In some cases, relative spatial orientations of the elements can be used as a secure or public ledger for information related to the object. For example, changing the spatial orientations (by modifying the object at 1508) can be associated with an update to the ledger.

Figure 16:
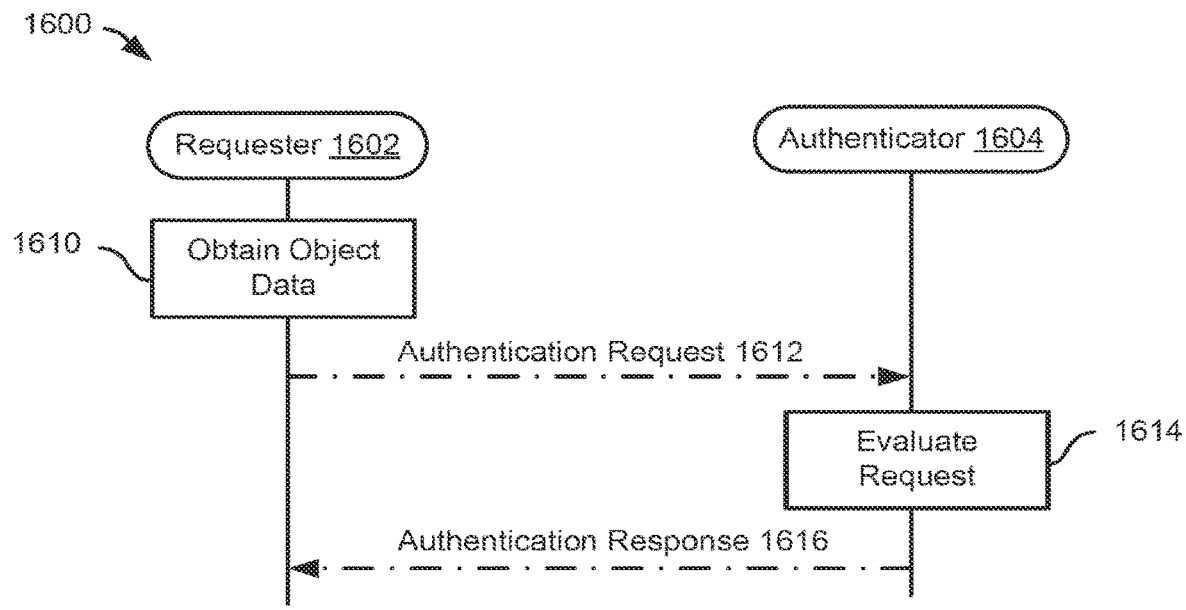
FIG. 16 is a flow diagram schematically illustrating an example authentication process.

FIG. 16 is a flow diagram schematically illustrating an example authentication process 1600. The example process 1600 may include additional or different operations, including operations performed by additional or different entities, and the operations may be performed in the order shown or in another order. In some cases, operations can be combined, performed in parallel, iterated or otherwise repeated or performed in another manner.

In some cases, operations shown in FIG. 16 are implemented by one or more computer systems. FIG. 16 shows the example process 1600 performed by a requester 1602 and an authenticator 1604. The requester 1602 and authenticator 1604 may represent computer-implemented modules deployed, for example, in a single computer system, in distinct computer systems (e.g., at disparate locations, in disparate environments, etc.), in a distributed computing system, or in processes of distinct entities (e.g., in a manufacturing process, an industrial process, a supply chain, a distribution channel, a financial process, a corporate workflow or another type of process). As an example, the requester 1602 may represent a process executed at the destination 1300 in FIG. 13, and the authenticator 1604 may represent a process executed at the authenticator 1350 in FIG. 13. As another example, the requester 1602 may represent a process executed at the second entity 1404 in FIG. 14, and the authenticator 1604 may represent a process executed at the first entity 1402 in FIG. 14.

The requester 1602 and authenticator 1604 communicate with each other during the process 1600. In some implementations, the requester 1602 and authenticator 1604 communicate with each other directly, for example, over a communication channel or a direct communication link. In some implementations, the requester 1602 and authenticator 1604 communicate with each other indirectly, for example, through access to a shared database or otherwise.

The example authentication process 1600 shown in FIG. 16 utilizes information extracted from a physical object. In some cases, the object referred to in the example process 1600 in FIG. 16 can be or include a unique marker (UM) of the types described above, an object of the type referred to in the process 1400 in FIG. 14, an object of the type referred to in the process 1500 in FIG. 15 or another type of object. In some implementations, the extracted information includes element information indicating properties of respective elements of the object (e.g., orientation information indicating relative spatial orientations of the respective elements).

The example authentication process 1600 may also utilize an object identifier and potentially other information related to the physical object. The object identifier can be, for example, a serial number of the object, a part number of the object, or an identity of a source, grade, type or quality of the object. The object identifier can be, for example, an identity or identifier for a person or other entity (e.g., name, address, phone number, username, social security number, etc.) associated with the object.

Before or during the process 1600, an authentication code is generated from element information extracted from the object, and the authentication code is associated with an object identifier for the object. The authentication code may be generated in the same manner that the unique code is generated in the process 1500 shown in FIG. 15. The object identifier and the authentication code can be associated, for example by storing them in a secure authentication database or in another manner. For instance, the object identifier can be the serial number 1207 in FIG. 12, the element information can be the orientation information 1206 in FIG. 12, and the object identifier and element information can be associated by linking them in the secure data storage 1208 in FIG. 12 (or the secure database 1351 in FIG. 13). The object identifier and authentication code may be associated in another manner.

In some implementations, additional information is stored in the secure authentication database or otherwise associated with the object identifier and the authentication code. For example, scanner settings used by a scanner system to extract the element information can be associated with the object identifier and the authentication code. The scanner settings may include, for example, values of parameters used in an extraction protocol performed on the object.

At 1610, the requester 1602 obtains object data. For example, the object data may include an authentication code based on element information that the requester 1602 extracted from the object. The authentication code can be or include, for example, a unique code generated by the requester 1602 from element information, as in the process 1500 shown in FIG. 15 or in another manner. The object data obtained at 1610 may also include an object identifier such as, for example, a serial number of the object. The object data obtained at 1610 may also include challenge-response data or other types of information.

At 1612, the requester 1602 sends an authentication request to the authentication provider. The authentication request may include or be based on the object data including, for example, the authentication code and the object identifier. In some cases, the authentication request includes additional information. For example, the authentication request may indicate scanner settings used by a scanner system of the requester 1602 to extract the element information.

At 1614, the authenticator 1604 evaluates the authentication request. The authentication request can be evaluated based on information in a secure authentication database or another type of secured system that is accessible to the authenticator 1604. As an example, the authenticator 1604 may use the object identifier (and in some cases, other information such as, for example, scanner settings, etc.) from the authentication request to find a valid authentication code that was previously associated with the object identifier. The authenticator 1604 may then compare the valid authentication code with the proffered authentication code in the authentication request.

At 1616, the authenticator 1604 sends an authentication response to the requester 1602. The authentication response in FIG. 16 includes authenticity data, which indicate a result of the evaluation performed at 1614. The authentication response may indicate the result as a binary value. For example, the authenticity data may indicate that the comparison yielded a match (e.g., the valid authentication code in the database matches the proffered authentication code in the authentication request exactly or within some tolerance), which may mean that the object is authentic; or the authenticity data may indicate that the comparison did not yield a match (e.g., the valid authentication code in the database does not match the proffered authentication code in the authentication request exactly or within some tolerance), which may mean that the object is inauthentic. The authentication response may indicate the result as a graded value. For example, the authenticity data may indicate a percentage or degree to which the valid authentication code matches the proffered authentication code in the authentication request, and the requester 1602 can interpret the graded value based on its own criteria (e.g., with reference to some tolerance or other acceptance criteria).

Figure 17:
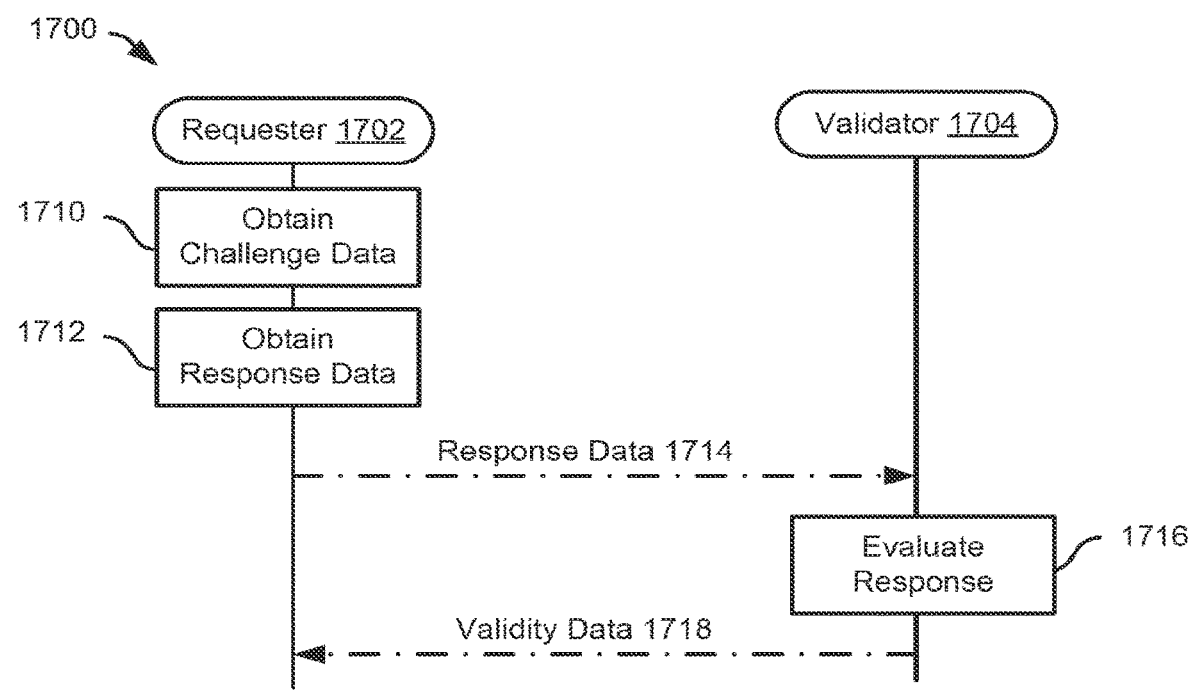
FIG. 17 is a flow diagram schematically illustrating an example challenge-response process.

FIG. 17 is a flow diagram schematically illustrating an example challenge-response process 1700. The example process 1700 may include additional or different operations, including operations performed by additional or different entities, and the operations may be performed in the order shown or in another order. In some cases, operations can be combined, performed in parallel, iterated or otherwise repeated or performed in another manner.

In some cases, operations shown in FIG. 17 are implemented by one or more computer systems. FIG. 17 shows the example process 1700 performed by a requester 1702 and a validator 1704. The requester 1702 and validator 1704 may be implemented similar to the requester 1602 and authenticator 1604 in FIG. 16, for example, as computer-implemented modules in one or more computer systems. As an example, the requester 1702 may represent a computer-implemented process executed at the destination 1300 in FIG. 13, and the validator 1704 may represent a computer-implemented process executed at the authenticator 1350 in FIG. 13. As another example, the requester 1702 may represent a process executed at the second entity 1404 in FIG. 14, and the validator 1704 may represent a process executed at the first entity 1402 in FIG. 14. The requester 1702 and validator 1704 communicate with each other (directly or indirectly) during the process 1700.

The example authentication process 1700 shown in FIG. 17 utilizes information extracted from a physical object. In some cases, the object referred to in the example process 1700 in FIG. 17 can be or include a unique marker (UM) of the types described above, an object of the type referred to in the process 1400 in FIG. 14, an object of the type referred to in the process 1500 in FIG. 15 or another type of object. In some implementations, the extracted information includes element information indicating properties of respective elements of the object (e.g., orientation information indicating relative spatial orientations of the respective elements). The example authentication process 1700 may also utilize an object identifier and potentially other information related to the physical object.

The challenge-response process 1700 may be executed as an authentication process (e.g., to authenticate the object) or for other purposes. In some cases, the challenge-response process 1700 is used where the object is deployed as a physically unclonable function (PUF). For instance, when a particular stimulus or challenge is applied to the object, the object can provide a predictable response that is unique to the object and difficult or impractical (or even impossible) to obtain without the object. The response to an individual challenge may depend, for example, on a highly-complex internal structure of the object, which is difficult or impractical (or even impossible) to duplicate or determine analytically. Accordingly, the object, when deployed as a PUF, may serve the same purpose as a one-way function (e.g., a hash function) in some instances.

At 1710, the requester 1702 obtains challenge data. For example, the challenge data may indicate an extraction protocol that can be used by a scanner system of the requester 1702 to extract element information from the object. In some cases, the challenge data indicate scanner settings for an extraction protocol. The scanner settings may include, for example, specific values for parameters of the scanner system to execute the extraction protocol. In some implementations, the requester 1702 obtains the challenge data from the validator 1704 or another external source. In some implementations, the requester 1702 generates the challenge data, for example, by randomly selecting scanner settings, by selecting a predefined set of scanner settings or otherwise.

At 1712, the requester 1702 obtains response data based on the challenge data. The response data may be obtained by interrogating the object according to the challenge data, for instance, by executing an extraction protocol using scanner settings indicated by the challenge data. The response data may include a unique code generated from element information that was extracted from the object using the challenge data. The element information may be extracted from the object as in the process 1500 shown in FIG. 15 or in another manner. The response data obtained at 1712 may also include an object identifier such as, for example, a serial number of the object.

At 1714, the requester 1702 sends response data to the validator 1704. In some cases, the requester 1702 also sends the challenge data to the validator 1704. The requester 1702 may also send an object identifier or other information to the validator 1704.

At 1716, the validator 1704 evaluates the response data. The response data can be evaluated based on information in a secure authentication database or another type of secured system that is accessible to the validator 1704. As an example, the validator 1704 may use the challenge data (and in some cases, other information such as, for example, an object identifier, etc.) to find a valid response that was previously obtained from the object. The validator 1704 may then compare the valid response (e.g., from a secure database) with the proffered response in the response data.

In some cases, the validator 1704 uses a pre-defined valid response to evaluate the response data at 1716. For instance, the validator 1704 may have access to a challenge-response library for the object, where each valid response in the challenge-response library is associated with a distinct challenge. The challenge-response library may be defined before the challenge-response process 1700 is executed, for example, by interrogating the object based on a set of distinct challenges or in another manner. In some cases, the validator 1704 generates the valid response during the challenge-response process 1700 based on the challenge data obtained at 1710. For instance, the validator 1704 may have access to complete element information for the object, which may enable the validator 1704 to compute a valid response based on the challenge data.

At 1718, the validator 1704 sends validity data to the requester 1702. The validity data in FIG. 17 indicate a result of the evaluation performed at 1716. The validity data may indicate the result as a binary value. For example, the validity data may indicate that the comparison yielded a match (e.g., the valid response in the database matches the proffered response in the response data exactly or within some tolerance), which may mean that the response is valid; or the validity data may indicate that the comparison did not yield a match (e.g., the valid response in the database does not match the proffered response in the response data exactly or within some tolerance), which may mean that the response is invalid. The validity data may indicate the result as a graded value, for instance, as a percentage or degree to which the valid response matches the proffered response, and the requester 1702 can interpret the graded value based on its own criteria (e.g., with reference to some tolerance or other acceptance criteria).

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data-processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet) and peer-to-peer networks (e.g., ad hoc peer-to-peer networks). A relationship of client and server may arise by virtue of computer programs running on the respective computers and having a client-server relationship to each other.

In a general aspect, element information is used to generate a code. In some examples, the element information can include orientation information and possibly other information describing diamond particles or other types of elements.

In a first example, an object that includes multiple elements is received. Orientation information is extracted from the object by a scanner system detecting the elements. The orientation information indicates relative spatial orientations of the respective elements. A unique code is generated for the object based on the orientation information.

Implementations of the first example may include one or more of the following features. Extracting the orientation information can include obtaining an optical response to illumination applied to the object. Extracting the orientation information can include obtaining fluorescence images of the object, determining the relative spatial orientations of the respective elements from the fluorescence images. Obtaining an optical response to illumination can include detecting fluorescence changes of the elements in response to changes in the illumination, and the relative spatial orientations can be determined based on detected fluorescence changes. The unique code generated from the orientation information can be independent of (e.g., invariant under changes in) the angle or angles at which the illumination is applied to the object.

Implementations of the first example may include one or more of the following features. Extracting the orientation information can include obtaining a magnetic resonance response to an oscillatory (e.g., radio frequency, microwave, etc.) electromagnetic field applied to the object, and determining the relative spatial orientations based on the magnetic resonance response. Obtaining the magnetic resonance response can include positioning the object in an external magnetic field, applying the oscillatory electromagnetic field to the object in the external magnetic field, and optically detecting magnetic resonance changes of the elements in response to relative changes (e.g., changes in field strength or orientation) in the external magnetic field, relative changes (e.g., relative changes in signal amplitude, frequency or phase) in the oscillatory electromagnetic field, or relative changes in both. The unique code generated from the orientation information can be independent of (e.g., invariant under changes in) the angle or angles at which the oscillatory electromagnetic field and external magnetic field are applied to the object.

Implementations of the first example may include one or more of the following features. The object can include a superset of elements, and the unique code can be generated based on the relative spatial orientations of only a subset of elements, which includes less than all of the elements in the superset. The orientation information extracted from the object can indicate the relative spatial orientations of only the subset of elements. The orientation information extracted from the object can indicate the relative spatial orientations of all the elements in the superset, and a subset of the orientation information indicating relative spatial orientations of the subset can be identified.

Implementations of the first example may include one or more of the following features. The orientation information can be extracted independent of registering the object relative to the scanner system. The orientation information can indicate the relative spatial orientations of the elements in a two-dimensional coordinate space or in a three-dimensional coordinate space. The orientation information can indicate the relative spatial orientations in a format that is invariant to global rotations of a coordinate system of the object.

Implementations of the first example may include one or more of the following features. The orientation information can include a list of coordinate transformations (e.g., transformation matrices) describing the relative spatial orientations of the respective elements. The list can include a composite transformation matrix for each element. The list of composite transformation matrices can be invariant to global rotations of the coordinate system of the object. In cases where the elements are diamond particles, the composite transformation matrix for each element can represents a first transformation between a coordinate system of the object and a coordinate system of the diamond particle; and a second transformation between the coordinate system of the diamond particle and a coordinate system of a color center in the diamond particle.

Implementations of the first example may include one or more of the following features. The elements can be crystalline particles, and the object can include the crystalline particles fixed in a medium. The crystalline particles can be diamond particles that have respective color centers, and extracting the orientation information can include detecting the relative orientations of the color centers.

Implementations of the first example may include one or more of the following features. Location information, Indicating relative spatial positions of the respective elements, can be extracted from the object. Topographical information, indicating relative spatial topographies of the respective elements, can be extracted from the object. Magnetic environment information, indicating magnetic environments of the respective elements, can be extracted from the object. The unique code can be generated from any combination of location information, topographical information, magnetic environment information and orientation information.

Implementations of the first example may include one or more of the following features. The unique code can be a first unique code, and the relative spatial orientations of at least some of the elements can be changed by modifying the object. A second, different unique code for the object can be generated based on orientation information extracted from the object after changing the relative spatial orientations. The relative spatial orientations can be used, for example, as a ledger for information related to the object.

Implementations of the first example may include one or more of the following features. The scanner system can include a sample region, a probe and a processor. The sample region can be configured to receive the object. The probe can be configured to extract orientation information from the object by detecting the elements. The processor can be configured to generate the unique code for the object based on the orientation information. The probe can include an optical imaging system (e.g., a fluorescence imaging system) configured to extract the orientation information by applying illumination to the object and obtaining optical responses (e.g., fluorescence responses) to the illumination. In some cases, optical imaging systems can be configured to obtain an optical response based on Raman scattering or another nonlinear effect (e.g., second harmonic generation, spontaneous parametric down conversion, etc.). The probe can include a magnetic resonance system configured to extract the orientation information by applying fields (e.g., an oscillatory electromagnetic field and an external magnetic field) to the object and obtaining magnetic resonance responses to the fields.

In a second example, orientation information indicating relative spatial orientations of respective elements of an object is obtained. A unique code for the object from the orientation information.

Implementations of the second example may include one or more of the following features. The unique code can be used in a challenge-response protocol. The orientation information can be extracted based on challenge data for the challenge-response protocol, the unique code can be used to generate response data for the challenge-response protocol, and the response data can be sent to an authenticator.

Implementations of the second example may include one or more of the following features. The unique code can be used in an authentication process. The authentication process can be executed to authenticate a source of the object. The authentication process can be executed to verify integrity of the object. The authentication process can be executed to verify a chain of custody of the object.

Implementations of the second example may include one or more of the following features. The unique code can be used in a cryptographic process. The unique code can be used to obtain a secret key for an encryption protocol, a digital signature protocol or another type of cryptographic process.

Implementations of the second example may include one or more of the following features. The object can include a superset of elements, and the unique code can be generated based on the relative spatial orientations of only a subset of elements, which includes less than all of the elements in the superset. The orientation information can indicate the relative spatial orientations of the elements in a two-dimensional coordinate space or in a three-dimensional coordinate space. The orientation information can indicate the relative spatial orientations in a format that is invariant to global rotations of a coordinate system of the object.

Implementations of the second example may include one or more of the following features. The orientation information can include a list of coordinate transformations (e.g., transformation matrices) describing the relative spatial orientations of the respective elements. The list can include a composite transformation matrix for each element. The list of composite transformation matrices can be invariant to global rotations of the coordinate system of the object. In cases where the elements are diamond particles, the composite transformation matrix for each element can represents a first transformation between a coordinate system of the object and a coordinate system of the diamond particle; and a second transformation between the coordinate system of the diamond particle and a coordinate system of a color center in the diamond particle.

In a third example, a suspension of elements is formed in an object, and the suspension of elements is used to generate a unique code for the object. The suspension of elements can be, for example, a suspension of diamond particles.

Implementations of the third example may include one or more of the following features. The suspension can be formed by distributing diamond particles on a surface of the object. Distributing the diamond particles on a surface of the object can include applying, to the surface of the object, paint that contains the diamond particles. Distributing the diamond particles on a surface of the object can include applying, to the surface of the object, conformal coating material that contains the diamond particles.

Implementations of the third example may include one or more of the following features. The suspension can be formed by distributing the diamond particles in a material and forming the object from the material containing the diamond particles. Forming the object from the material can include forming the object by an injection molding process. Forming the object from the material can include forming the object by an additive manufacturing process. Forming the object from the material can include forming the object by a printing process. Forming the object from the material can include forming a workpiece from the material and removing material from the workpiece.

Implementations of the third example may include one or more of the following features. The object is sent from a sending entity to a receiving entity, and the unique code is used in an authentication process executed between the sending entity and the receiving entity. The suspension of diamond particles is used as a physically unclonable function (PIUF), a ledger for information related to the object or otherwise.

Implementations of the third example may include one or more of the following features. A manufacturing system is configured to form the suspension of diamond particles in the object. A scanner system is configured to extract particle information from the object, and the particle information indicates properties of the respective diamond particles in the suspension. A computer system is configured to generate the unique code for the object based on the particle information.

In a fourth example, orientation information indicating relative spatial orientations of respective elements of an object is received. An authentication code is generated from the orientation information. The authentication code is associated with an object identifier of the object.

Implementations of the fourth example may include one or more of the following features. The object can include a unique marker applied to an article, and the object identifier can be a serial number of the article. The article can be distributed, and the authentication code and the serial number can be stored in a secure authentication database. The orientation information can be extracted from the unique marker by operation of a scanner system, and the scanner settings used by the scanner system to extract the orientation information can be stored in the secure authentication database. The unique marker can enables a recipient of the article to authenticate the article.

In a fifth example, an authentication process is performed. The authentication process includes receiving an object identifier for an object; receiving an authentication code for the object, the authentication code being based on detected relative orientations of respective elements of the object; and authenticating the object based on the authentication code and the object identifier.

Implementations of the fifth example may include one or more of the following features. The object can include a unique marker applied to an article, and the object identifier can include a serial number of the article. Authenticating the object can include communicating the authentication code and the object identifier to an authenticator. Authenticating the object can include evaluating the authentication code based on information in a secure authentication database. Authenticating the object can include executing an authentication process to authenticate a source of the object, to authenticate integrity of the object, or to authenticate a chain of custody of the object.

In a sixth example, a challenge-response protocol is performed. Challenge data for the challenge-response protocol is obtained. Based on the challenge data, orientation information is extracted from an object by operation of a scanner system detecting the relative spatial orientations of respective elements of the object. The challenge data include a parameter used by the scanner system to detect the relative spatial orientations. Based on the orientation information, response data are generated for the challenge-response protocol.

Implementations of the sixth example may include one or more of the following features. The response data can be sent to a validator to verify the response data for the challenge-response protocol. An outcome of the challenge-response protocol, based on the challenge data and the response data, can be received from the validator. Obtaining the challenge data can include receiving the challenge data from the validator. Obtaining the challenge data can include generating the challenge data at the scanner system.

In a seventh example, a challenge-response protocol is performed. Challenge data and response data for the challenge-response protocol are obtained. The challenge data include a parameter for extracting orientation information from an object, and the response data are based on orientation information extracted from the object (e.g., by a scanner system) using the parameter. The orientation information indicate relative spatial orientations of respective elements of the object. The challenge data and response data are used to determine whether the response data represent a valid response to the challenge data.

Implementations of the seventh example may include one or more of the following features. Determining whether the response data represent a valid response to the challenge data can include evaluating the orientation information based on valid information in a secure authentication database. The valid information can be obtained from the secure authentication database based on the challenge data and an object identifier of the object. A validator can receive the challenge data and the response data from a remote scanner system, and the validator can send the remote scanner system an indication of whether the response data represent a valid response.

Implementations of the fourth, fifth, sixth and seventh examples may include one or more of the following features. The elements can be diamond particles that have respective color centers, and the orientation information can be extracted by detecting relative orientations of the color centers. Extracting the orientation information can include obtaining an optical response (e.g., a fluorescence response) to illumination applied to the diamond particles. The orientation information may be extracted by optically detected magnetic resonance of the diamond particles. The authentication code and the object identifier can be used in an authentication process to authenticate the object.

In some implementations, a system includes a data processing apparatus and a computer-readable medium storing instructions that are operable when executed by the data processing apparatus to perform one or more operations of the examples above. In some implementations, a computer-readable medium stores instructions that are operable when executed by a data processing apparatus to perform one or more operations of the examples above.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method for generating a unique code for an object, the method comprising:
   receiving an object comprising elements, wherein the elements are flakes or foils, and each element has an external structure that defines an orientation of the element;
   extracting orientation information from the object, the orientation information indicating relative spatial orientations of the respective elements with respect to one another, the orientation information being extracted by a scanner system detecting the elements; and
   generating a unique code for the object based on the orientation information.

2. The method of claim 1, wherein extracting the orientation information comprises obtaining an optical response to illumination applied to the object.

3. The method of claim 1, wherein the object comprises a superset of elements, and the method comprises:
   extracting orientation information indicating relative spatial orientations of only a subset of elements in the superset; and
   generating the unique code based on the relative spatial orientations of only the subset of elements.

4. The method of claim 1, wherein the object comprises a superset of elements, and the method comprises:
   extracting orientation information indicating relative spatial orientations of all elements in the superset;
   identifying a subset of the orientation information indicating relative spatial orientations of a subset of the elements in the superset; and
   generating the unique code based on the relative spatial orientations of only the subset of elements.

5. The method of claim 1, wherein the orientation information is extracted independent of registering the object relative to the scanner system.

6. The method of claim 1, comprising:
   extracting location information from the object, the location information indicating relative spatial positions of the respective elements with respect to one another; and
   generating the unique code for the object based on the orientation information and the location information.

7. The method of claim 1, wherein the orientation information indicates the relative spatial orientations of the elements in a three-dimensional coordinate space.

8. The method of claim 1, wherein the orientation information indicates the relative spatial orientations of the elements in a two-dimensional coordinate space.

9. The method of claim 1, wherein the orientation information indicates the relative spatial orientations in a format that is invariant to global rotations of a coordinate system of the object.

10. The method of claim 1, wherein the orientation of each element is defined by an axis or a plane of the external structure of the element.

11. A scanner system comprising:
    a sample region configured to receive an object comprising elements, wherein the elements are flakes or foils, and each element has an external structure that defines an orientation of the element;
    a probe configured to extract orientation information from the object by detecting the elements, the orientation information indicating relative spatial orientations of the respective elements with respect to one another; and
    a processor configured to generate a unique code for the object based on the orientation information.

12. The scanner system of claim 11, wherein the probe comprises an optical imaging system, and extracting the orientation information comprises obtaining an optical response to illumination applied to the object.

13. The scanner system of claim 11, wherein the unique code generated from the orientation information is independent of any angle at which the illumination is applied to the object.

14. The scanner system of claim 11, wherein the object comprises a superset of elements, and the unique code is generated based on the relative spatial orientations of only a subset of the elements.

15. The scanner system of claim 11, wherein the orientation of each element is defined by an axis or a plane of the external structure of the element.

16. A method for generating a unique code for an object, the method comprising:
    obtaining orientation information extracted from an object, the orientation information indicating relative spatial orientations of respective elements of the object with respect to one another, wherein the elements are flakes or foils, and each element has an external structure that defines an orientation of the element; and
    by operation of one or more processors, generating a unique code for the object from the orientation information.

17. The method of claim 16, comprising:
    obtaining location information extracted from the object, the location information indicating relative spatial positions of the elements with respect to one another; and
    by operation of one or more processors, generating the unique code from the orientation information and the location information.

18. The method of claim 16, comprising using the unique code in a challenge-response protocol.

19. The method of claim 16, comprising using the unique code in an authentication process.

20. The method of claim 16, comprising using the unique code in cryptographic process.

21. The method of claim 16, wherein the orientation of each element is defined by an axis or a plane of the external structure of the element.

* * * * *